(12) United States Patent
Matsuda

(10) Patent No.: US 9,787,805 B2
(45) Date of Patent: Oct. 10, 2017

(54) COMMUNICATION CONTROL SYSTEM AND COMMUNICATION CONTROL METHOD

(71) Applicant: FUJITSU LIMITED, Kawasaki-shi (JP)

(72) Inventor: Takashi Matsuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 356 days.

(21) Appl. No.: 13/741,576

(22) Filed: Jan. 15, 2013

(65) Prior Publication Data

US 2013/0262690 A1 Oct. 3, 2013

(30) Foreign Application Priority Data

Mar. 27, 2012 (JP) .................. 2012-071877

(51) Int. Cl.
*G06F 15/16* (2006.01)
*H04L 29/06* (2006.01)
*H04L 29/08* (2006.01)

(52) U.S. Cl.
CPC ............ *H04L 69/16* (2013.01); *H04L 69/161* (2013.01); *H04L 69/169* (2013.01); *H04L 69/321* (2013.01); *H04L 69/168* (2013.01)

(58) Field of Classification Search
CPC ............ H04L 67/1002; H04L 67/1097; H04L 67/2814; H04L 12/66; H04L 12/2825; H04L 12/2856; H04L 12/2876; H04L 49/901; H04L 49/9042; H04L 49/602; H04L 49/90; H04L 69/16; G05B 19/042; G05B 19/4185; G05B 2219/25198; G05B 2219/31162

USPC .................... 709/230, 245; 710/65
See application file for complete search history.

(56) References Cited

U.S. PATENT DOCUMENTS 5,778,189 A * 7/1998 Kimura ................ G06F 13/387
 709/236
6,396,839 B1 * 5/2002 Ardalan .............. H02J 13/0062
 340/870.02
6,400,729 B1 * 6/2002 Shimadoi ................ H04L 69/08
 370/466

(Continued)

FOREIGN PATENT DOCUMENTS

| JP | 2004-222059 | 8/2004 |
| JP | 2007-110240 | 4/2007 |
| JP | 2010-250778 | 11/2010 |

*Primary Examiner* — Joseph E Avellino
*Assistant Examiner* — Patrick Ngankam
(74) *Attorney, Agent, or Firm* — Fujitsu Patent Center

(57) ABSTRACT

A computer includes a WAN driver that causes data to be transmitted from a guest domain to a computer to use a first protocol, a WANonTCP/IP driver and a TCP/IP driver that add identification information of the guest domain to the data and cause the data to use a second protocol, and a LAN driver that transmits the data to the line accommodation apparatus using the second protocol. The line accommodation apparatus includes a line GW control unit that acquires the identification information of the guest domain from the data, extracts a line card corresponding to the identification information, and causes the received data to use a third protocol; a line card driver that transmits the data to the computer via the extracted line card using the third protocol.

5 Claims, 15 Drawing Sheets

(56) References Cited

U.S. PATENT DOCUMENTS

2007/0083672 A1* 4/2007 Shima ............... H04L 29/12009
                                                          709/245
2011/0145426 A1* 6/2011 Miyajima ........... H04L 63/0272
                                                          709/230

* cited by examiner

FIG.5A

| LINE DESCRIPTION NAMES | LINE ADDRESSES |
|---|---|
| LINE4108 | 4108 |
| LINE4109 | 4109 |
| LINE410A | 410A |
| LINE410B | 410B |

FIG.5B

```
ENVIRONMENT DEFINITION

NETWORK

LINE ADDRESS OF RECEIVING SIDE        4108
LINE ADDRESS OF TRANSMITTING SIDE     4109
IP ADDRESS                            10.12.13.50
PORT NUMBER                           10400
SLOT INFORMATION                      00:03.0
IDENTIFICATION NAME                   HOST01
```

COMMUNICATION CONTROL SYSTEM AND COMMUNICATION CONTROL METHOD

CROSS-REFERENCE TO RELATED APPLICATION

This application is based upon and claims the benefit of priority of the prior Japanese Patent Application No. 2012-071877, filed on Mar. 27, 2012, the entire contents of which are incorporated herein by reference.

FIELD

The embodiments discussed herein are directed to a communication control system, a communication control method, and a communication control program.

BACKGROUND

Some companies operate systems that perform communication using high-level data link control (HDLC) or a protocol which is a unique protocol other than the transmission control protocol/internet protocol (TCP/IP). In such systems, when communication is performed via a wide area network (WAN), a WAN line using a protocol other than the TCP/IP is used. Hereinafter, the WAN line using a protocol, such as the HDLC or a unique protocol, other than TCP/IP is also referred to as a "legacy WAN line."

In the past, when a computer that performs communication using the TCP/IP performed communication using a legacy WAN line, a network card configured to perform communication using the legacy WAN line was mounted on the computer in order to perform communication. Hereinafter, the network card configured to perform communication using a legacy WAN line is also referred to as a "line card." In such communication, data obtained by adding a WAN protocol header defined in accordance with a protocol used for communication using the legacy WAN line to user data is transmitted and received via a line card.

In recent years, an operation form, such as a cloud service, has been spread in which a user accesses an external system via a WAN and receives a service using resources of a system of an access destination. In such a service, various virtualized resources such as virtual machines are provided in many cases.

As a technology using a virtual machine, there is a conventional technology in which when there are a plurality of virtual machines with the same IP address and different MAC addresses, one representative virtual machine transmits and receives data to and from the outside to transmit data between other virtual machines. Further, as a technology for connecting a LAN to a WAN, there is a conventional technology for encapsulating data with a PPP communication frame and causing a terminal in a household local area network (LAN) to communicate with a terminal connected to a public network. Furthermore, as a technology for a virtualization system, there is a conventional technology in which when there are a plurality of virtualization systems, an optimum amount of computer resource is provided to users.

Patent Literature 1: Japanese Laid-open Patent Publication No. 2007-110240
Patent Literature 2: Japanese Laid-open Patent Publication No. 2004-222059
Patent Literature 3: Japanese Laid-open Patent Publication No. 2010-250778

When a system using a legacy WAN line uses a service such as a cloud service, the following problems may occur. A line card is hardware that is uniquely made to perform communication using a legacy WAN line. For example, the line card stores operation information at the time of communication in an internal memory or a register in many cases. When such a line card is used, it is difficult for a virtual machine other than a virtual machine that performs communication using the line card to use the information stored in the line card. For this reason, even when attempting to switch a virtual machine by performing migration, a virtual machine of a migration destination is not able to use the information in the line card, and thus is not able to perform communication. That is, when the line card is used, the migration function in the virtualization technology is not able to be used. Thus, when the line card is used, it is not possible to cope with a general virtualization technology, and therefore it is difficult to embed the line card in the general virtualization technology. For this reason, it is difficult for a system using a legacy WAN line to receive a service from a virtualization system.

Even in the conventional technology for causing one representative virtual machine to transmit and receive data to and from the outside, it is difficult to embed the line card in a virtualization technology and it is difficult to associate a system using a legacy WAN line with a virtualization system. Further, in the conventional technology for causing a terminal in a household LAN to communicate with a terminal connected to a public network, it is assumed that both the terminals perform TCP/IP communication and it is difficult to associate a system using a legacy WAN line with a virtualization system. Furthermore, in the conventional technology for providing users with an optimum amount of computer resource from a plurality of virtualization systems, it is also difficult to embed a line card in a virtualization technology and it is difficult to associate a system using a legacy WAN line with a virtualization system.

SUMMARY

According to an aspect of an embodiment, a communication control system includes: an information processing apparatus in which a plurality of virtual machines having different identification information are performed and a line accommodation apparatus, wherein the information processing apparatus includes a first protocol data processing unit that processes data to be transmitted from one of the plurality of virtual machines to another information processing apparatus so as to use a first protocol, a second protocol data processing unit that adds identification information of a corresponding virtual machine to the data processed by the first protocol data generating unit and processes the data so as to use a second protocol different from the first protocol, and a data transmitting unit that transmits the data processed by the second protocol data processing unit to the line accommodation apparatus using the second protocol, and wherein the line accommodation apparatus includes a data converting unit that acquires the added identification information of the corresponding virtual machine from the data received from the data transmitting unit, extracts a network card corresponding to the identification information from a plurality of network cards, and converts the received data so as to use a third protocol different from both the first and second protocols, and a transmitting unit that transmits the data generated by the data converting unit to another information processing apparatus via the network card extracted by the data converting unit using the third protocol.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A is a diagram illustrating a correspondence between line addresses and line description names;

FIG. 5B is a diagram illustrating environment definition information in communication;

DESCRIPTION OF EMBODIMENTS

Preferred embodiments of the present invention will be explained with reference to accompanying drawings. Further, the communication control system, the communication control method, and the communication control program disclosed in the present disclosure are not limited to these embodiments.

[a] First Embodiment

Figure 1:
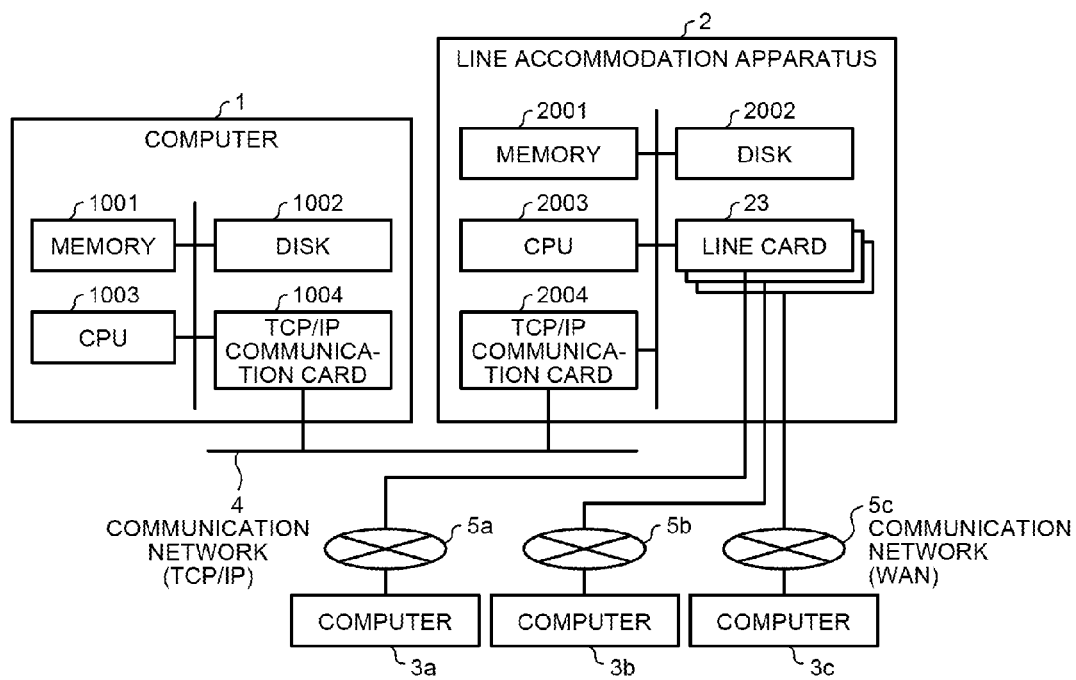
FIG. 1 is a diagram illustrating a hardware configuration of a communication control system according to a first embodiment.

FIG. 1 is a diagram illustrating a hardware configuration of a communication control system according to a first embodiment. The communication control system according to this embodiment includes a computer 1, a line accommodation apparatus 2, and computers 3a to 3c. The computer 1 and the line accommodation apparatus 2 are connected to each other via a communication network 4 that performs communication using the TCP/IP. The communication network 4 is, for example, a LAN. Further, the line accommodation apparatus 2 and the computers 3a to 3c are connected to each other via communication networks 5a to 5c that perform communication using protocols other than the TCP/IP, respectively. The communication networks 5a to 5c are, for example, legacy WAN lines. In the communication networks 5a to 5c, for example, lines such as a dedicated line, a telephone line, a line switching network, a packet switching network, an integrated services digital network (ISDN), a high-speed digital line, and a frame relay are used. Further, in the communication networks 5a to 5c, a communication card (hereinafter, referred to as a "line card") configured to transmit and receive data using a protocol other than the TCP/IP is used to perform communication. In other words, the line card is a network card which is unique to communication using a legacy WAN line. A protocol used in a communication network 5 is a protocol defined in advance between the computer 1 and the computers 3a to 3c. The protocol is, for example, an HDLC or a unique protocol of a computer maker.

The computer 1 is a computer that has a virtualization system. The computer 1 includes a memory 1001, a DISK 1002, a central processing unit (CPU) 1003, and a TCP/IP communication card 1004. The computer 1 corresponds to an example of an "information processing apparatus."

The memory 1001, the DISK 1002, and the TCP/IP communication card 1004 are connected to the CPU 1003 via a bus. The DISK 1002 stores various programs that realize processing performed by the computer 1 to be described below. The CPU 1003 reads various programs from the DISK 1002, and then loads and executes various processes on the memory 1001 to realize the processing of the computer 1.

The TCP/IP communication card 1004 transmits and receives data to and from the line accommodation apparatus 2 via the communication network 4 using the TCP/IP protocol.

The line accommodation apparatus 2 includes a memory 2001, a DISK 2002, a CPU 2003, a TCP/IP communication card 2004, and a line card 23. One or more line cards 23 are mounted on the line accommodation apparatus 2.

The memory 2001, the DISK 2002, the TCP/IP communication card 2004, and the line card 23 are connected to the CPU 2003 via a bus. The DISK 2002 stores various programs that realize processing performed by the line accommodation apparatus 2 to be described below. The CPU 2003 reads various programs from the DISK 2002, and then loads and executes various processes on the memory 2001 to realize the processing of the line accommodation apparatus 2.

The TCP/IP communication card 2004 transmits and receives data to and from the computer 1 via the communication network 4 using the TCP/IP protocol.

The line card 23 transmits and receives data to and from the computers 3a to 3c via the communication networks 5a to 5c, respectively, using protocols other than the TCP/IP protocol. Here, three communication networks and three computers are illustrated in FIG. 1, but the numbers of communication networks and computers are particularly not limited.

Figure 2:
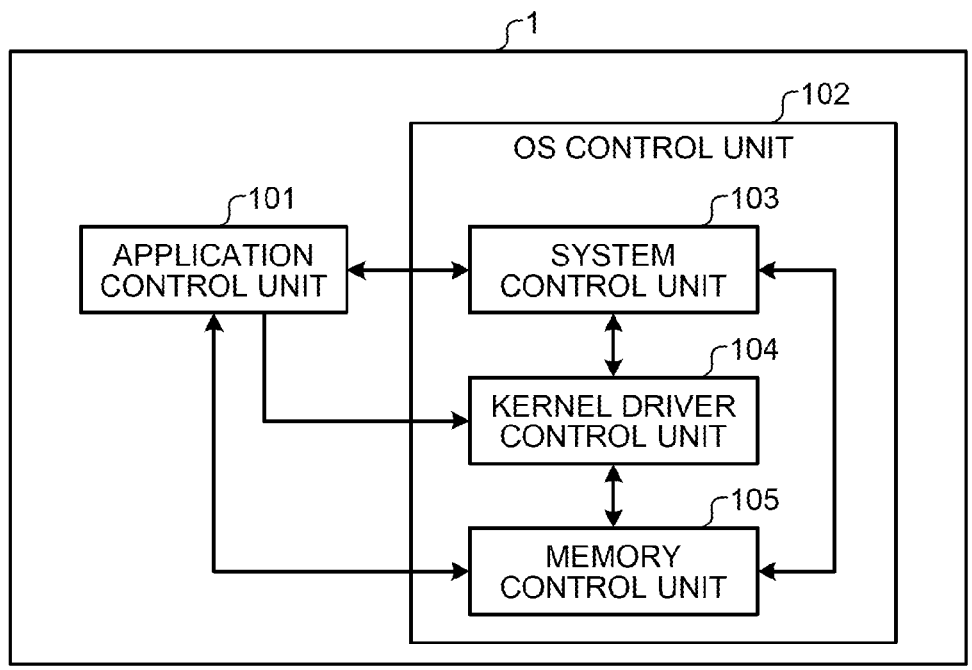
FIG. 2 is a block diagram illustrating a computer 1.

FIG. 2 is a block diagram illustrating the computer 1. The computer 1 includes an application control unit 101 and an operating system (OS) control unit 102.

The application control unit 101 executes various applications, while transmitting and receiving data to and from the OS control unit 102.

The OS control unit 102 generally controls operations of various hardware units mounted on the computer 1 or the entire system of the computer 1. The OS control unit 102 includes a system control unit 103, a kernel driver control unit 104, and a memory control unit 105.

The system control unit 103 generally controls the entire system of the computer 1.

The kernel driver control unit 104 manages the resources of the system and manages transmission and reception of components to and from hardware and software. Further, the kernel driver control unit 104 controls the operations of various drivers such as a network driver to be described below.

The memory control unit 105 manages storing or reading of data in or from a memory.

Figure 3:
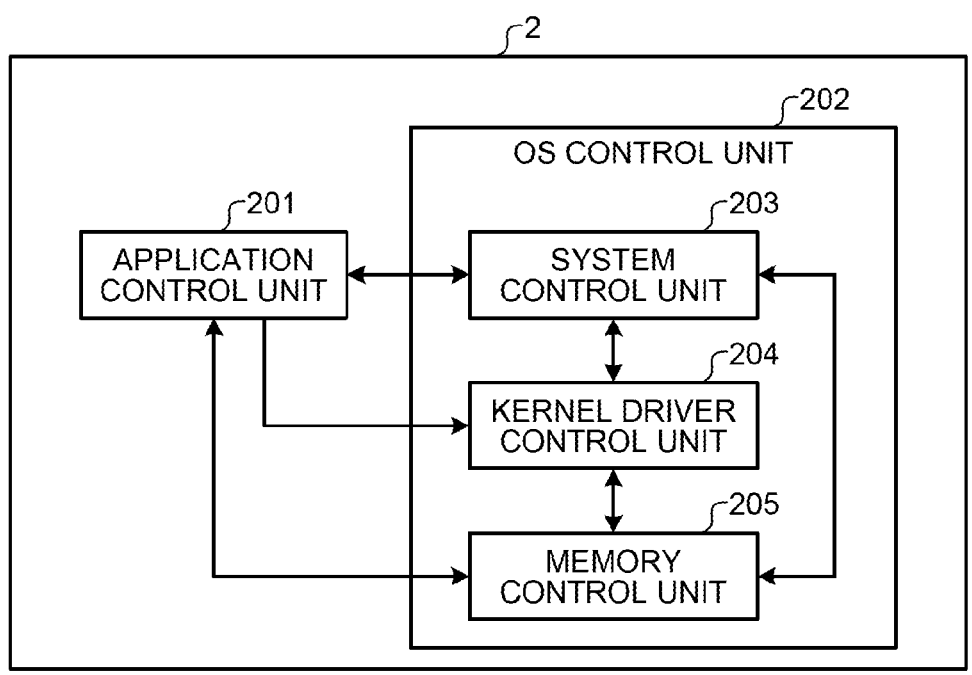
FIG. 3 is a block diagram illustrating a line accommodation apparatus 2.

FIG. 3 is a block diagram illustrating the line accommodation apparatus 2. The line accommodation apparatus 2 includes an application control unit 201 and an OS control unit 202.

The application control unit 201 executes various applications, while transmitting and receiving data to and from the OS control unit 202.

The OS control unit 202 generally controls operations of various hardware units mounted on the line accommodation apparatus 2 or the entire system of the line accommodation apparatus 2. The OS control unit 202 includes a system control unit 203, a kernel driver control unit 204, and a memory control unit 205.

The system control unit 203 generally controls the entire system of the line accommodation apparatus 2.

The kernel driver control unit 204 manages the resources of the system and manages transmission and reception of components to and from hardware and software. Further, the kernel driver control unit 204 controls the operations of various drivers such as a network driver to be described below.

The memory control unit 205 manages storing or reading of data in or from a memory.

Figure 4:
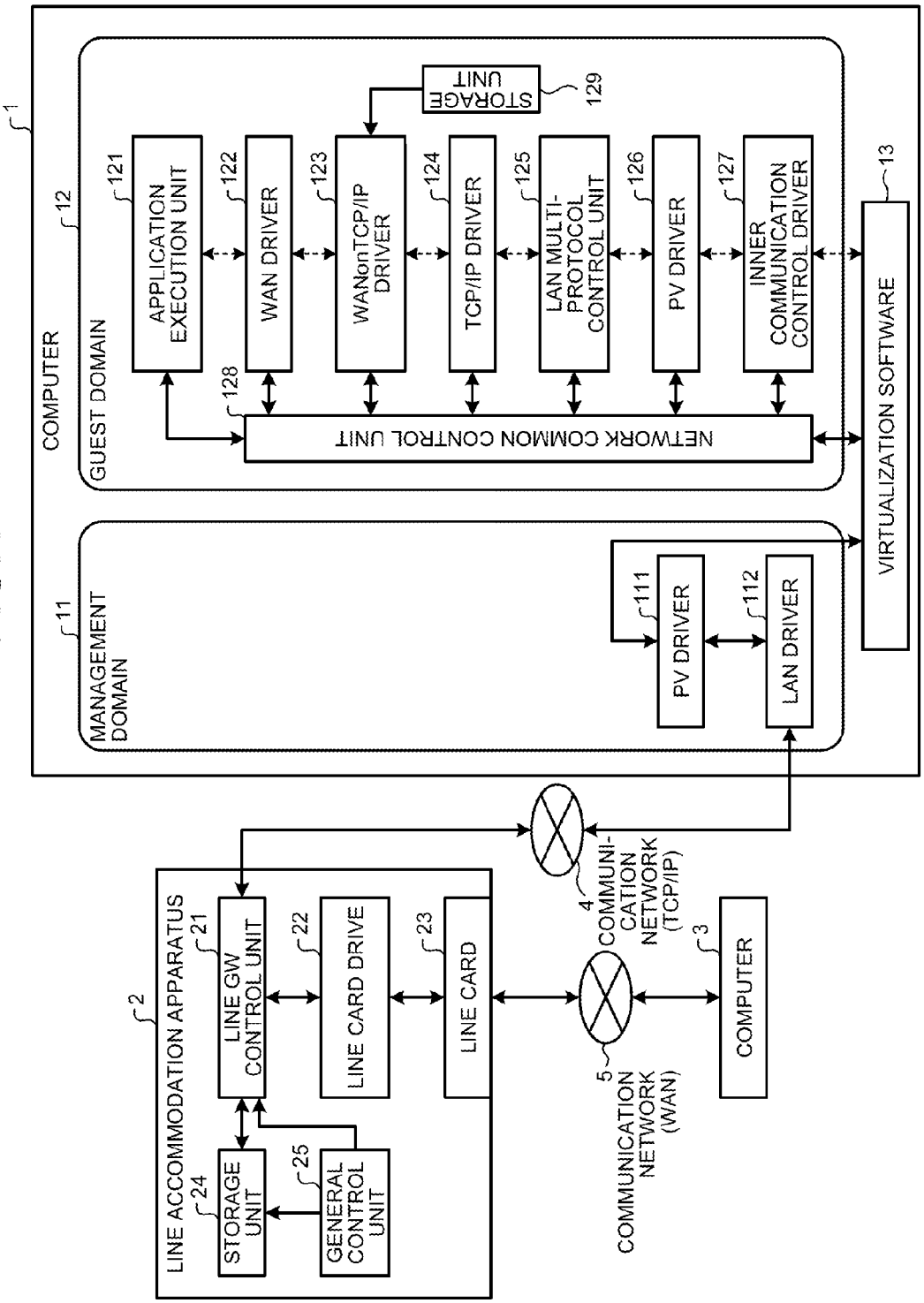
FIG. 4 is a schematic diagram illustrating the communication control system according to the first embodiment.

Next, the detailed configuration and the operation of the communication control system according to this embodiment will be described with reference to FIG. 4. FIG. 4 is a diagram illustrating the configuration of the communication control system according to the first embodiment.

In this embodiment, a management domain 11 and a guest domain 12 which are virtual machines are installed in the computer 1. The computer 1 is a computer that provides services to a computers 3. For example, the computer 1 provides a cloud service of providing the functions of various applications.

The management domain 11 is a virtual machine that manages a virtual machine function. The management domain 11 includes a para-virtualized driver (PV) driver 111 and a LAN driver 112.

The PV driver 111 is a virtual inner communication driver that realizes communication between virtual machines. The PV driver 111 transmits and receives data to and from a PV driver 126 to be described below via an inner communication control driver 127. The PV driver 111 outputs, to the LAN driver 112, data received from the PV driver 126 and communication information including designation of a LAN card to be used. The communication information will be described in detail later.

The LAN driver 112 operates the TCP/IP network card. Specifically, the LAN driver 112 is a driver that performs communication with a TCP/IP network card of the line accommodation apparatus 2 via the communication network 4 using a TCP/IP network card in conformity with the TCP/IP protocol. The LAN driver 112 receives data and communication information from the PV driver 111. The LAN driver 112 specifies the TCP/IP network card or the like to be used based on the communication information added to the data. The LAN driver 112 acquires the IP address and the port number of the line accommodation apparatus 2 added to the data. The LAN driver 112 outputs data to the acquired IP address and port number using the specified TCP/IP network card.

The guest domain 12 is a virtual machine that executes an application or the like and actually provides a service. The guest domain 12 includes an application execution unit 121, a WAN driver 122, a WANonTCP/IP driver 123, a TCP/IP driver 124, a LAN multi-protocol control unit 125, the PV driver 126, and the inner communication control driver 127.

The application execution unit 121 realizes some of the functions of the application control unit 101 in FIG. 2. The application execution unit 121 stores applications to be used by a user who connects to the computer 1 using the computer 3. The application execution unit 121 reads and executes the stored applications. The application execution unit 121 acquires user data generated by the applications. Here, the user data is data in the application layer. The user uses the user data through the applications.

The application execution unit 121 acquires line description names for designating a virtual network to be used in the line card 23, when receiving an instruction to perform communication with the computer 3 from the application. The application execution unit 121 acquires information indicating a slot in which the line card 23 to be used is inserted in the line accommodation apparatus 2. For example, when full-duplex communication is used, the application execution unit 121 acquires the line description name of a receiving side and the line description name of a transmitting side as the line description names.

The application execution unit 121 outputs, to a network common control unit 128, the line description names to be used and the slot information of the line card 23 in the line accommodation apparatus 2 together with the user data.

When the application execution unit 121 acquires the data transmitted from the computer 3 from the network common control unit 128, the application execution unit 121 processes the acquired data by executing the application.

The network common control unit 128 realizes some of the functions of the kernel driver control unit 104 in FIG. 2. The network common control unit 128 performs relay of the communication between an application and each driver and relay of the communication between the drivers. For example, the network common control unit 128 outputs the user data received from the application execution unit 121 to the WAN driver 122. The network common control unit 128 outputs the user data received from the WAN driver 122 to the WANonTCP/IP driver 123. In this way, in effect, the transmission and reception of the data between each driver and the other drivers are performed via the network common control unit 128. However, the flow of data will sometimes be described, just as the drivers directly transmit and receive the data to facilitate the description, as indicated by dotted arrows in FIG. 4. The network common control unit 128 performs control management on a cue used to transmit and receive data or a command by the WANonTCP/IP driver 123 to be described below.

The WAN driver 122 is a driver that performs communication with the computer 3 via the communication network 5 which is a legacy WAN line. The WAN driver 122 receives the user data output from the application execution unit 121 via the network common control unit 128. The WAN driver 122 changes the user data so as to have the form of a protocol by which transmission and reception can be performed via the communication network 5. The WAN driver 122 adds information used to access the line card 23 to the user data. The information used to access the line card 23 is, for example, operation control information of the line card 23, apparatus information of the computers 1 and 3, and memory region designation of the user data. Further, the WAN driver 122 changes the user data so as to have the form of a protocol by which transmission and reception can be performed via the communication network 5 and outputs the user data, to which the operation control information of the line card 23 is added, to the WANonTCP/IP driver 123 via the network common control unit 128.

The WAN driver 122 receives data transmitted by the computer 3 from the WANonTCP/IP driver 123 using protocol information of the communication performed using the legacy WAN line, the protocol information being added to the data transmitted by the computer 3. The WAN driver 122 outputs the data transmitted by the computer 3 to the application execution unit 121 via the network common control unit 128. The WAN driver 122 corresponds to an example of a "first protocol data processing unit."

The WANonTCP/IP driver 123 is a program that executes relay between the WAN driver 122 and the TCP/IP driver 124. The WANonTCP/IP driver 123 receives the user data, which is changed so as to have the form of a protocol by which transmission and reception can be performed via the communication network 5, from the WAN driver 122 via the network common control unit 128. The WANonTCP/IP driver 123 reads the information of the line card 23 corresponding to the line description name designated by the application execution unit 121 from a storage unit 129.

Here, examples of the information stored by the storage unit 129 include line addresses corresponding to the line description names illustrated in FIG. 5A and environment definition information in communication illustrated in FIG. 5B. FIG. 5A is a diagram illustrating a correspondence between the line addresses and the line description names. FIG. 5B is a diagram illustrating the environment definition information in communication. As illustrated in FIG. 5A, the storage unit 129 stores the line description names and the line addresses in correspondence therewith. The storage unit 129 stores the IP address of the line accommodation apparatus 2, the port number of the line accommodation apparatus 2, and the slot information of the line card 23 used in the line accommodation apparatus 2 in correspondence with each line description name. Specifically, the storage unit 129 stores the information as a file. An administrator or the like stores the information in advance in the storage unit 129 in accordance with a communication environment.

For example, acquisition of information regarding the line card 23 by the WANonTCP/IP driver 123 will be described, when the line description names is "LINE4108" and "LINE4109." In this case, the WANonTCP/IP driver 123 acquires the corresponding line addresses 4108 and 4109 with reference to the information stored by the storage unit 129, as illustrated in FIG. 5A. Further, the WANonTCP/IP driver 123 acquires 10.12.13.50 as the IP address of the line accommodation apparatus 2 and acquires the 10400 as the port number with reference to the information illustrated in FIG. 5B. The WANonTCP/IP driver 123 acquires 00:03.0 as the slot information of the line card 23. The WANonTCP/IP driver 123 acquires HOST01 as the identification name of the guest domain 12. Thus, the WANonTCP/IP driver 123 checks the address of the designated line card 23 and the slot of the line accommodation apparatus 2. In this embodiment, the communication is performed using the line description name within the guest domain 12. However, the communication can be performed directly using the line address without the use of the line description name.

In the first embodiment, the connection to one guest domain 12 is performed using two line addresses corresponding to the line description names "LINE4108" and "LINE4109" illustrated in FIG. 5A. The available number of guest domains 12 depends on the number of line addresses which the line card 23 has. For example, when the line card 23 has two line addresses and a total number of line card 23 is four, a total available number of guest domains 12 is four.

The WANonTCP/IP driver 123 adds information regarding a protocol defined between the line accommodation apparatus 2 and a line GW control unit 21 to the user data. The information regarding the protocol added by the WANonTCP/IP driver 123 is, for example, information regarding whether a given line includes the line address of the line card and the identification name of the guest domain 12 is used for communication or activation information of a service in which communication is performed using a legacy WAN line.

The WANonTCP/IP driver 123 outputs the user data, to which information used to access the line card 23 is added, to the TCP/IP driver 124 via the network common control unit 128. Further, the WANonTCP/IP driver 123 transmits the IP address of the line accommodation apparatus 2 and the port number of the line accommodation apparatus 2 to the TCP/IP driver 124 by socket.

The WANonTCP/IP driver 123 receives the data transmitted by the computer 3 from the TCP/IP driver 124 using the information regarding the protocol defined with the line GW control unit 21 added to the data transmitted by the computer 3. The WANonTCP/IP driver 123 outputs the data transmitted by the computer 3 to the WAN driver 122 via the network common control unit 128.

Figure 6:
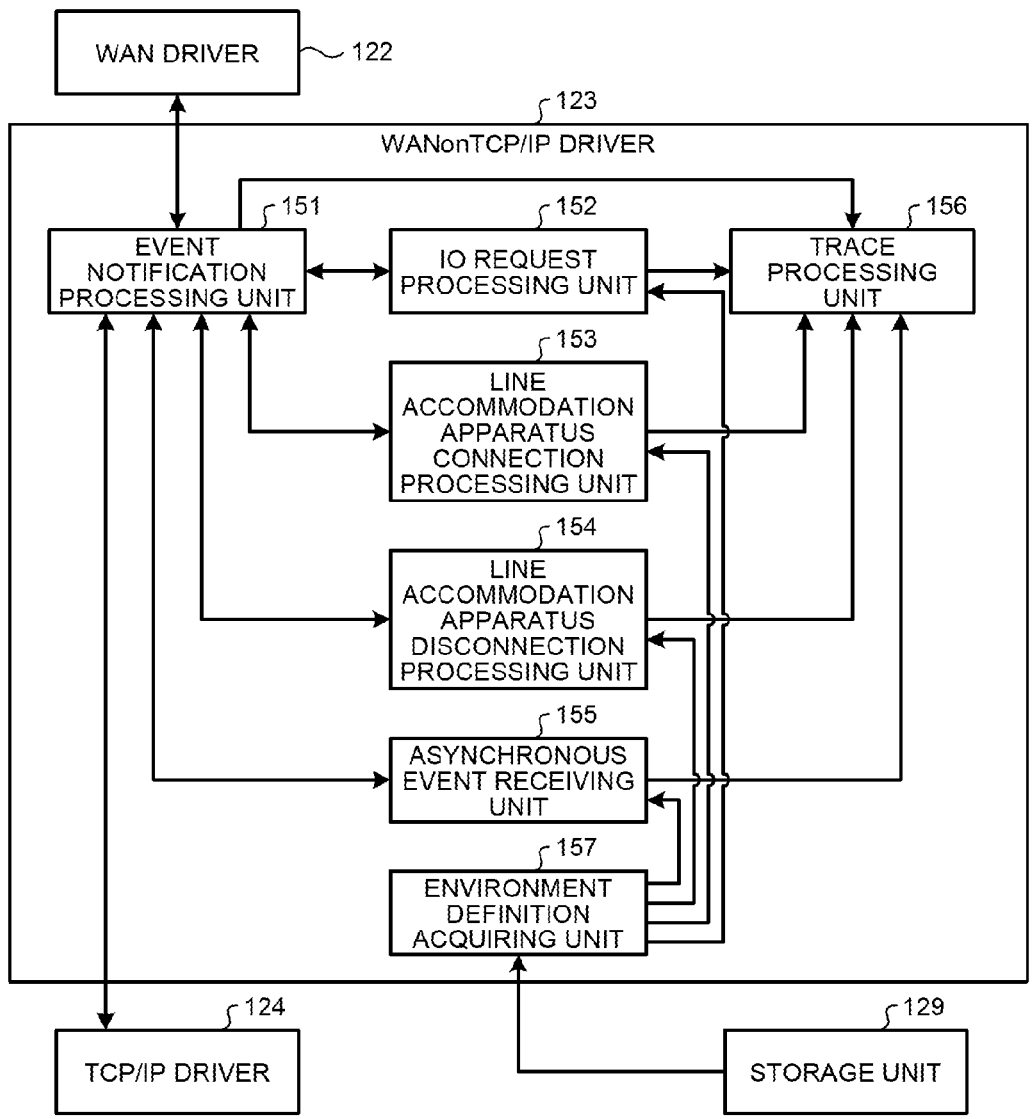
FIG. 6 is a detailed block diagram illustrating a WANon-TCP/IP driver.

Hereinafter, the function of the WANonTCP/IP driver 123 will be described in more detail with reference to FIG. 6. FIG. 6 is a detailed block diagram illustrating the WANonTCP/IP driver.

As illustrated in FIG. 6, the WANonTCP/IP driver 123 includes an event notification processing unit 151, an input/output (IO) request processing unit 152, a line accommodation apparatus connection processing unit 153, a line accommodation apparatus disconnection processing unit 154, an asynchronous event receiving unit 155, a trace processing unit 156, and an environment definition acquiring unit 157.

The event notification processing unit 151 transmits and receives data and a request (command) to and from the WANonTCP/IP driver 123, and the WAN driver 122 or the TCP/IP driver 124 using the cue.

The environment definition acquiring unit 157 acquires information regarding the line card 23 corresponding to the line description name and the line address stored in the storage unit 129 and to the line address designated from the environment definition information. Specifically, the environment definition acquiring unit 157 acquires the information regarding the line card 23 and loads this information on the memory. The IO request processing unit 152, the line accommodation apparatus connection processing unit 153, the line accommodation apparatus disconnection processing unit 154, and the asynchronous event receiving unit 155 refer to and use the information regarding the line card 23 acquired by the environment definition acquiring unit 157.

The IO request processing unit 152 transmits an IO request received from the WAN driver 122 to the line accommodation apparatus 2 via the TCP/IP driver 124. The IO request processing unit 152 transmits the IO request to the TCP/IP driver 124, since the IO request processing unit 152 encapsulates the IO request using the protocol of the line control data into the TCP/IP. When the length of the transmission data of the IO request exceeds the length of the transmission buffer defined by the TCP/IP, the IO request processing unit 152 divides the IO request by the length of transmission and reception buffer and transmits the IO request to the TCP/IP driver 124. The IO request processing unit 152 acquires the information regarding the line card 23 and adds information regarding the protocol to the user data.

The line accommodation apparatus connection processing unit 153 activates a network connecting process and establishes socket communication with the WANonTCP/IP driver 123 and the line GW control unit 21 of the line accommodation apparatus 2. When the line accommodation apparatus connection processing unit 153 receives an activation request from the WAN driver 122, the line accommodation apparatus connection processing unit 153 makes a connection request to the line accommodation apparatus 2. Here, the activation request is a notification to activate the network connecting process.

The line accommodation apparatus disconnection processing unit 154 disconnects the socket communication between the WANonTCP/IP driver 123 and the line GW control unit 21 of the line accommodation apparatus 2 in the following cases. In one of the cases, the line accommodation apparatus disconnection processing unit 154 receives a non-activation request from the WAN driver 122. Here, the non-activation request is a notification to stop the network connection. In another of the cases, the line accommodation apparatus disconnection processing unit 154 receives a notification of network collapse or a protocol error from the TCP/IP driver 124 by a socket application program interface (API). In still another of the cases, an internal inconsistency error occurs within the WANonTCP/IP driver 123.

The asynchronous event receiving unit 155 receives an asynchronous event transmitted from the line GW control unit 21 of the line accommodation apparatus 2 and processes the synchronous event.

The trace processing unit 156 performs inner trace of extracting information regarding the process performed by the WANonTCP/IP driver 123 and storing the information in a memory and performs network common trace of extracting information regarding a process generated in a network and storing the information in a memory. The network common trace is used for maintenance of a network or the like. In the case of the network common trace, the trace processing unit 156 extracts cue information transmitted and received to and from the event notification processing unit 151 to extract the contents of the transmission and reception of the cue. The inner trace is used to trace the processes performed in occurrence of a failure. Specifically, in the inner trace, the trace processing unit 156 records errors occurring inside the WANonTCP/IP driver 123 and control information between the WANonTCP/IP driver 123 and the other drivers.

The TCP/IP driver 124 is a program used to perform communication with the line accommodation apparatus 2 via the communication network 4 using the TCP/IP. The TCP/IP driver 124 receives the user data and the socket from the WANonTCP/IP driver 123 via the network common control unit 128.

The TCP/IP driver 124 changes the user data to data having a format transmittable and receivable via the communication network 4 using the TCP/IP, based on the IP address and the port number of the line accommodation apparatus 2 received by the socket communication. The TCP/IP driver 124 changes the user data to have a format communicable using the TCP/IP in the state in which the information regarding the protocol for transmission and reception via the communication network 5 is included. The TCP/IP driver 124 outputs the changed user data having the format communicable using the TCP/IP to the LAN multi-protocol control unit 125 via the network common control unit 128.

The TCP/IP driver 124 receives the data transmitted from the computer 3 and transmitted by the line GW control unit 21 based on the information regarding the TCP/IP protocol added to the data transmitted by the computer 3 by the line GW control unit 21. The TCP/IP driver 124 outputs the data transmitted by the computer 3 to the WANonTCP/IP driver 123 via the network common control unit 128.

The WANonTCP/IP driver 123 and the TCP/IP driver 124 correspond to an example of a "second protocol data processing unit."

The LAN multi-protocol control unit 125 receives the user data from the TCP/IP driver 124. The LAN multi-protocol control unit 125 designates, for example, communication information regarding which LAN card mounted on the computer 1 is used. The LAN multi-protocol control unit 125 outputs the user data together with the communication information to the PV driver 126.

The PV driver 126 receives the communication information and the user data from the LAN multi-protocol control unit 125. The PV driver 126 transmits the user data to the PV driver 111 of the management domain 11.

The inner communication control driver 127 receives the user data from the PV driver 126. The inner communication control driver 127 transmits the user data received from the PV driver 126 to the PV driver 111 of the management domain 11. The inner communication control driver 127 also performs communication relay by transmitting the data output from an I/O such as a hard disk in the guest domain 12 to an I/O designated in the management domain 11.

A virtualization software 13 is software that generally manages the virtualization system in the computer 1. For example, the virtualization software 13 transmits, to the PV driver 111, the user data output from the inner communication control driver 127 to the PV driver 111.

The LAN multi-protocol control unit 125, the PV driver 126, the inner communication control driver 127, the PV driver 111, and the LAN driver 112 correspond to an example of a "data transmitting unit."

The line accommodation apparatus 2 includes the line gateway (GW) control unit 21, a line card driver 22, the line card 23, a storage unit 24, and a general control unit 25.

Figure 7:
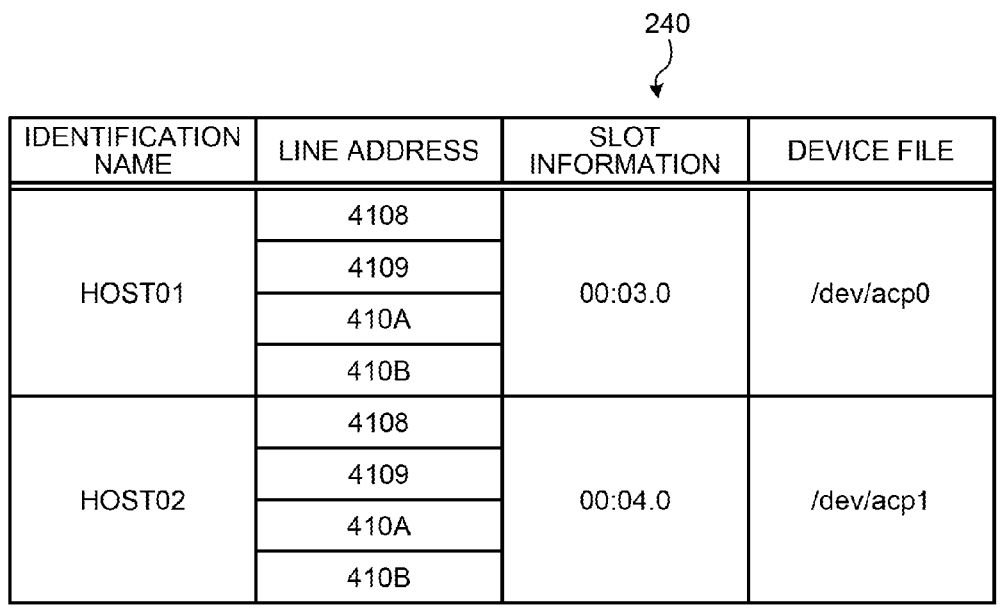
FIG. 7 is a diagram illustrating a correspondence table indicating a correspondence between line addresses and line cards.

The storage unit 24 is a storage device that includes a hard disk. The storage unit 24 stores an operation log received from the line GW control unit 21. The storage unit 24 stores configuration information of the line card 23. The configuration information also includes a correspondence table 240 indicating a correspondence between the line addresses and the line cards, as illustrated in FIG. 7. FIG. 7 is a diagram illustrating a correspondence table indicating the correspondence between the line addresses and the line cards. As illustrated in FIG. 7, the correspondence table 240 describes the identification names of the guest domains 12, the line addresses, and a device file indicating the physical positions of the line cards corresponding to a combination of the slot information in the line accommodation apparatus 2. The storage unit 24 receives an instruction from the general control unit 25 and initializes the stored configuration information of the line card 23. Here, in this embodiment, the correspondence between the line addresses and the line cards is managed based on the identification name but may be managed based on other information. For example, the correspondence can be managed using the IP address instead of the identification name. The storage unit 24 stores an operation environment definition file used to associate services performed by the line GW control unit 21 at the time of activating the line GW control unit 21 with the line cards 23. The operation environment definition file will be described in detail later.

The line GW control unit 21 performs communication with the WANonTCP/IP driver 123, analyzes the user data formed as TCP/IP data, and outputs the analysis result to the line card driver 22. The line GW control unit 21 forms the data received from the line card driver 22 as TCP/IP data and transmits the TCP/IP data to the WANonTCP/IP driver 123. The line GW control unit 21 acquires the device file corresponding to each line card from the line card driver 22 and stores the device file in the correspondence table 240 illustrated in FIG. 7 and stored in the storage unit 24.

Specifically, the line GW control unit 21 acquires the user data having a format of the TCP/IP protocol transmitted by the LAN driver 112 via the communication network 4. The line GW control unit 21 acquires information added to the user data by the WANonTCP/IP driver 123 and indicating which line card is used for the communication or service activation information used to perform the communication using a legacy WAN line. Here, the information indicating which line card is used for the communication includes the identification name, the line address, and the slot information described in the correspondence table 240 illustrated in FIG. 7. The line GW control unit 21 acquires the configuration information of the line card 23 used for the communication from line card configuration information 242 in the storage unit 24. Thereafter, the line GW control unit 21 confirms that the WAN communication service is activated. Thereafter, the line GW control unit 21 transmits the user data to the line card driver 22 and also notifies the line card driver 22 of an instruction to transmit the user data from the computer 1 to the computer 3 using the line card 23.

The line GW control unit 21 receives an instruction from the general control unit 25, generates an operation log, and stores the generated operation log in the storage unit 24. For example, the line GW control unit 21 generates a system log or a maintenance log as the operation log. The line GW control unit 21 corresponds to an example of a "data converting unit."

The general control unit 25 generally controls all of the processes of the line accommodation apparatus 2. For example, the general control unit 25 notifies the line GW control unit 21 of a command to activate and stop a service performed by the line GW control unit 21. The general control unit 25 activates the service performed by the line GW control unit 21 in accordance with the description of the operation environment definition file. When the general control unit 25 receives an instruction to output the state information from an operator, the general control unit 25 notifies the line GW control unit 21 of the generation and output of the log. When the general control unit 25 receives an instruction to stop outputting the state information from the operator, the general control unit 25 notifies the line GW control unit 21 that the generation and output of the log are stopped. When the general control unit 25 receives an instruction to initialize the configuration information of the line card 23 from the operator, the general control unit 25 deletes the configuration information of the line card 23 stored in the storage unit 24.

Figure 8:
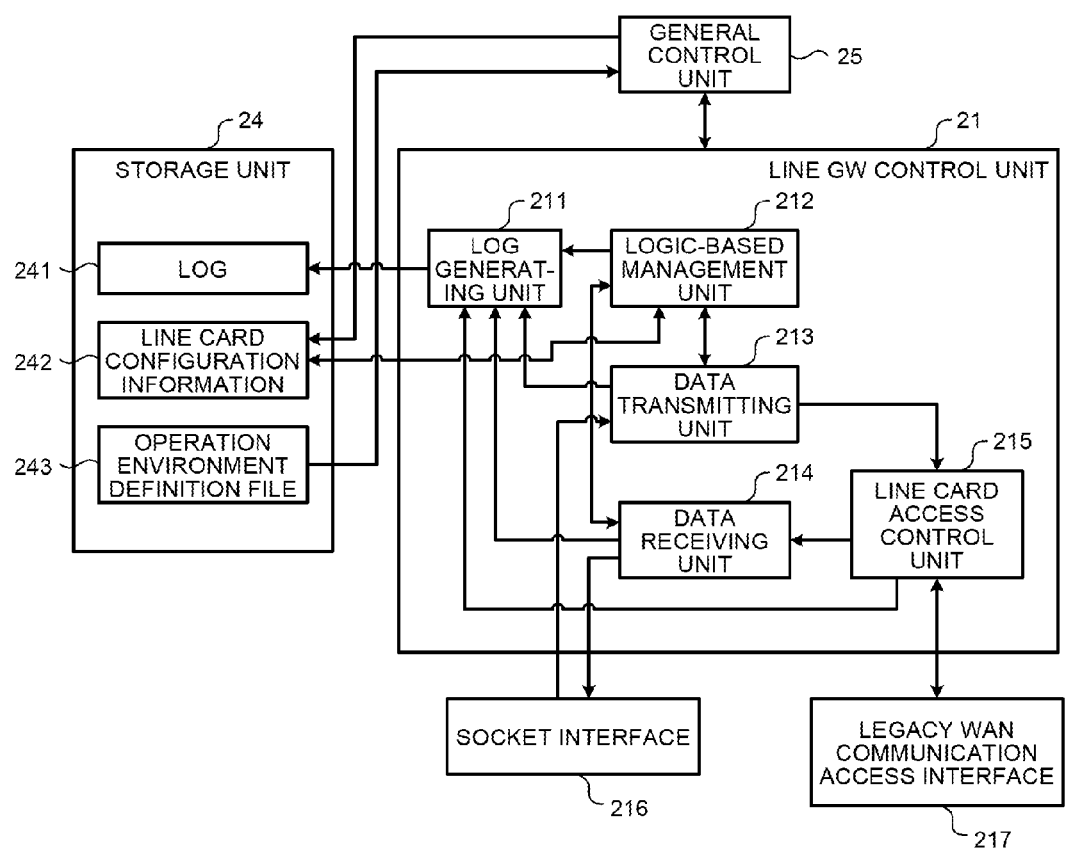
FIG. 8 is a detailed block diagram illustrating the line accommodation apparatus.

Hereinafter, the functions of the line accommodation apparatus 2 will be described in more detail with reference to FIG. 8. FIG. 8 is a detailed block diagram illustrating the line accommodation apparatus.

As illustrated in FIG. 8, the line GW control unit 21 includes a log generating unit 211, a logic-based management unit 212, a data transmitting unit 213, a data receiving unit 214, and a line card access control unit 215. The storage unit 24 stores a log 241, the line card configuration information 242, and an operation environment definition file 243.

The user data transmitted by the LAN driver 112 of the computer 1 is input to the data transmitting unit 213 via a socket interface 216 of a kernel space.

The data transmitting unit 213 acquires information regarding the slot into which the line card 23 to be used for the communication is inserted, and information regarding the line address, from the received user data. The data transmitting unit 213 transmits, to the logic-based management unit 212, the acquired information regarding the slot and the acquired information regarding the line address in the line card 23 to be used for the communication and makes a request for information regarding the corresponding line card 23.

The data transmitting unit 213 notifies the line card access control unit 215 of the information regarding the line card 23 acquired from the logic-based management unit 212. The data transmitting unit 213 outputs, to the line card access control unit 215, the user data to which the operation control information of the line card 23 is added.

The data transmitting unit 213 outputs operation information of the data transmitting unit 213 itself to the log generating unit 211.

The data receiving unit 214 receives data from the line card access control unit 215. The data receiving unit 214 acquires the information regarding the TCP/IP protocol used to communicate with the computer 1 from the logic-based management unit 212. The data receiving unit 214 converts the received data into data having a format of the TCP/IP. Thereafter, the data receiving unit 214 transmits the converted data to the LAN driver 112 of the computer 1 through the socket interface 216 via the communication network 4.

The data receiving unit 214 outputs operation information of the data receiving unit 214 itself to the log generating unit 211.

The logic-based management unit 212 stores the line card 23 corresponding to a combination between the slot into which the line card 23 to be used for the communication is inserted and the line address. The logic-based management unit 212 stores the information regarding the TCP/IP protocol used for communication with the computer 1.

When the logic-based management unit 212 acquires the information regarding the slot into which the line card 23 to be used for the communication is inserted, and the information regarding the line address, from the data transmitting unit 213, the logic-based management unit 212 specifies the corresponding line card 23. The logic-based management unit 212 acquires the configuration information of the specified line card 23 from the correspondence table 240 (see FIG. 7) indicating the correspondence between the line addresses and the line cards included in the line card configuration information 242 stored in the storage unit 24.

Thereafter, the logic-based management unit 212 outputs the acquired configuration information of the line card 23 to the data transmitting unit 213.

When the logic-based management unit 212 is notified of the reception of the data to be transmitted to the computer 1 from the data receiving unit 214, the logic-based management unit 212 transmits the information regarding the TCP/IP protocol used for the communication with the computer 1 to the data receiving unit 214.

The logic-based management unit 212 outputs operation information of the logic-based management unit 212 itself to the log generating unit 211.

The line card access control unit 215 receives input of the user data from the data transmitting unit 213. The line card access control unit 215 receives information regarding the line card 23 used for the communication from the data transmitting unit 213. The line card access control unit 215 acquires the operation control information of the line card 23 added to the received user data. The line card access control unit 215 instructs the line card driver 22 via a legacy WAN communication access interface 217 to transmit the user data to the computer 3 in accordance with the operation control information of the line card 23 using the designated line card 23. The legacy WAN communication access interface 217 is an interface with the kernel space.

The line card access control unit 215 receives the data transmitted from the computer 3 from the line card driver 22 via the legacy WAN communication access interface 217. The line card access control unit 215 outputs the received data to the data receiving unit 214.

The line card access control unit 215 outputs operation information of the line card access control unit 215 itself to the log generating unit 211.

The log generating unit 211 acquires the operation information from the logic-based management unit 212, the data transmitting unit 213, the data receiving unit 214, and the line card access control unit 215. When the log generating unit 211 receives a state output instruction from the general control unit 25, the log generating unit 211 generates a log based on the received operation information. Thereafter, the log generating unit 211 stores the log 241 in the storage unit 24.

The line card driver 22 receives the user data from the line GW control unit 21. The line card driver 22 receives an instruction to transmit the user data from the computer 1 to the computer 3 from the line GW control unit 21. The line card driver 22 acquires the address of the computer 3 in the communication protocol used in the communication network 5. The line card driver 22 transmits the user data to the computer 3 by controlling the line card based on the operation control information of the line card 23 added to the user data. The line card driver 22 corresponds to an example of a "transmitting unit."

The computer 3 receives the user data transmitted by the line card driver 22 using the communication protocol in the communication network 5 via the communication network 5. Thereafter, the computer 3 processes the received user data.

Figure 9:
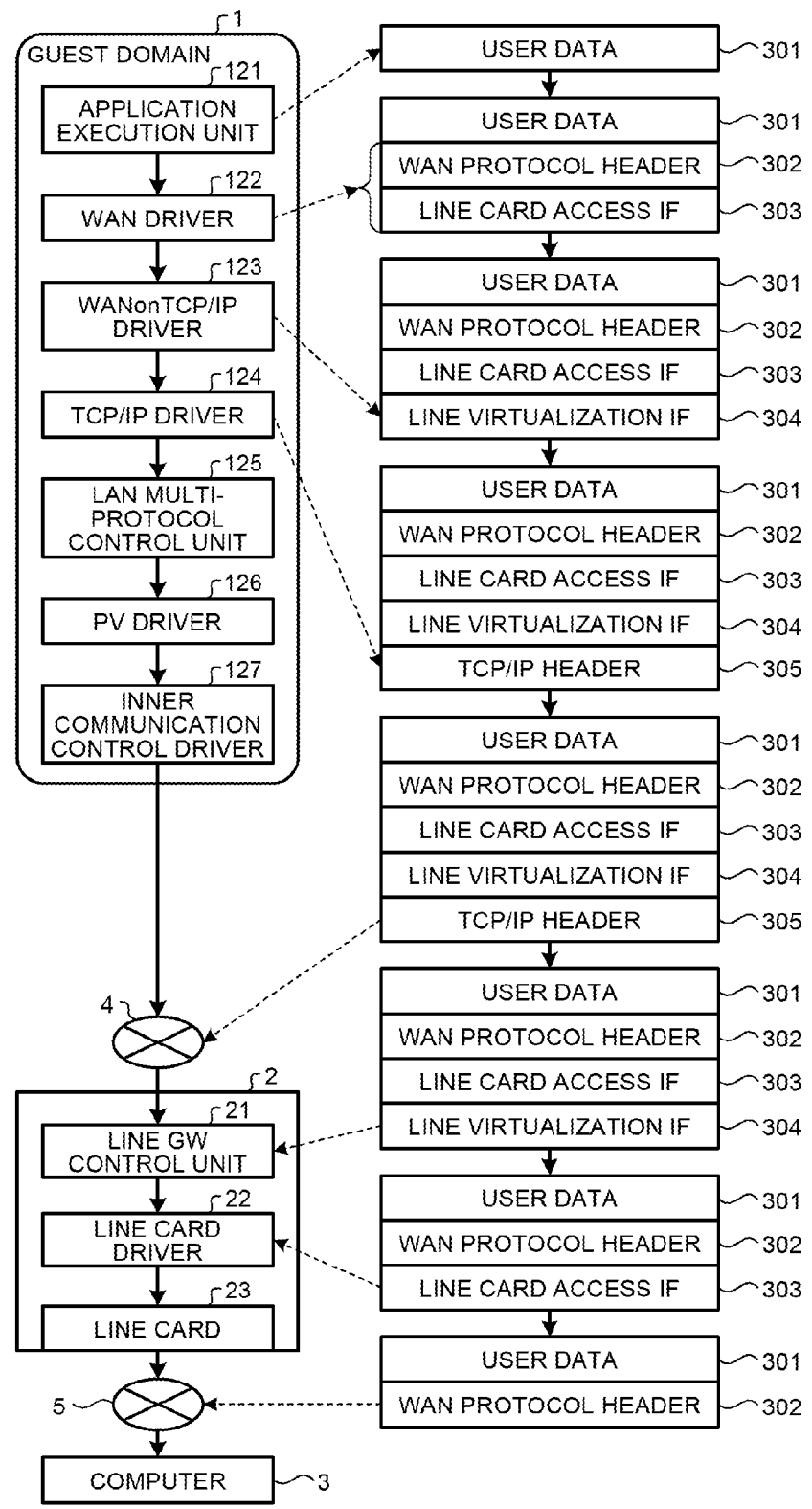
FIG. 9 is a diagram illustrating transition of user data at the time of transmitting the user data.

Next, transition of the user data at the time of transmitting the user data will be described with reference to FIG. 9. FIG. 9 is a diagram illustrating the transition of the user data at the time of transmitting the user data. Here, in practice, the data output from the inner communication control driver 127 is sent to the line accommodation apparatus 2 via the management domain 11, but the management domain 11 is not illustrated in FIG. 9 to facilitate the description. In FIG. 9, a dotted arrow indicates where the data present at the end of the dotted line is generated. A dotted arrow heading for a function unit from the side of data indicates that the data is used in the function unit present at the end of the dotted arrow. A dotted arrow heading for a communication network from the side of data indicates that the data is used for communication in a communication network present at the end of the dotted arrow.

The application execution unit 121 generates user data 301. The user data 301 is data of the application layer generated when the application execution unit 121 executes an application.

Next, the user data 301 generated by the application execution unit 121 is sent to the WAN driver 122. The WAN driver 122 adds a WAN protocol header 302 and a line card access IF (Inter Face) 303 to the user data 301.

The WAN protocol header 302 is control information used for the communication between the network common control unit 128 of the computer 1 and the computer 3. The WAN protocol header 302 is communication control information defined between the computers 1 and 3 and is, for example, an HDLC. In other words, in the WAN protocol header 302, information used to transmit data to the computer 3 via the communication network 5 is described.

The line card access IF 303 is information regarding an interface used to access the line card 23. For example, the line card access IF 303 includes apparatus information of the computers 1 and 3, memory region designation of the user data, and operation control information of the line card 23.

Next, the user data 301 to which the WAN protocol header 302 and the line card access IF 303 are added is sent to the WANonTCP/IP driver 123. The WANonTCP/IP driver 123 adds a line virtualization IF 304 to the user data 301.

The line virtualization IF 304 is a protocol defined between the WANonTCP/IP driver 123 and the line GW control unit 21. Specifically, the line virtualization IF 304 includes information regarding the line card 23 used for the communication and the service activation information used to perform the communication using a legacy WAN line.

Next, the user data 301 to which the line virtualization IF 304 is added is sent to the TCP/IP driver 124. Then, the TCP/IP driver 124 adds a TCP/IP header 305 to the user data 301 based on the IP address and the port number of the line accommodation apparatus 2 received by the socket communication. Thus, the user data 301 has a format transmittable and receivable via the communication network 4 using the TCP/IP.

Next, the user data 301 to which the TCP/IP header 305 is added is sent to the line GW control unit 21 through the LAN multi-protocol control unit 125, the PV driver 126, and the inner communication control driver 127 via the communication network 4. At this time, the user data 301 is sent to the line GW control unit 21 based on the information regarding the address or the port number stored in the TCP/IP header 305.

The line GW control unit 21 confirms that the service starts to be activated with reference to the service activation information stored in the line virtualization IF 304 and used to perform the communication using the legacy WAN line. The line GW control unit 21 acquires the configuration information of the line card 23 used for the communication from the storage unit 24 based on the information regarding the line card 23 stored in the line virtualization IF 304 and used for the communication.

Next, the user data 301 to which the WAN protocol header 302 and the line card access IF 303 are added is sent together with the configuration information of the line card 23 to the line card driver 22. Then, the line card driver 22 operates the designated line card 23 based on the information stored in the line card access IF 303 and used to access the line card 23 and transmits the user data 301 to the computer 3 via the communication network 5. At this time, the user data 301 is transmitted to the computer 3 based on the information regarding the protocol stored in the WAN protocol header 302 and used for the communication in the legacy WAN line.

Figure 10:
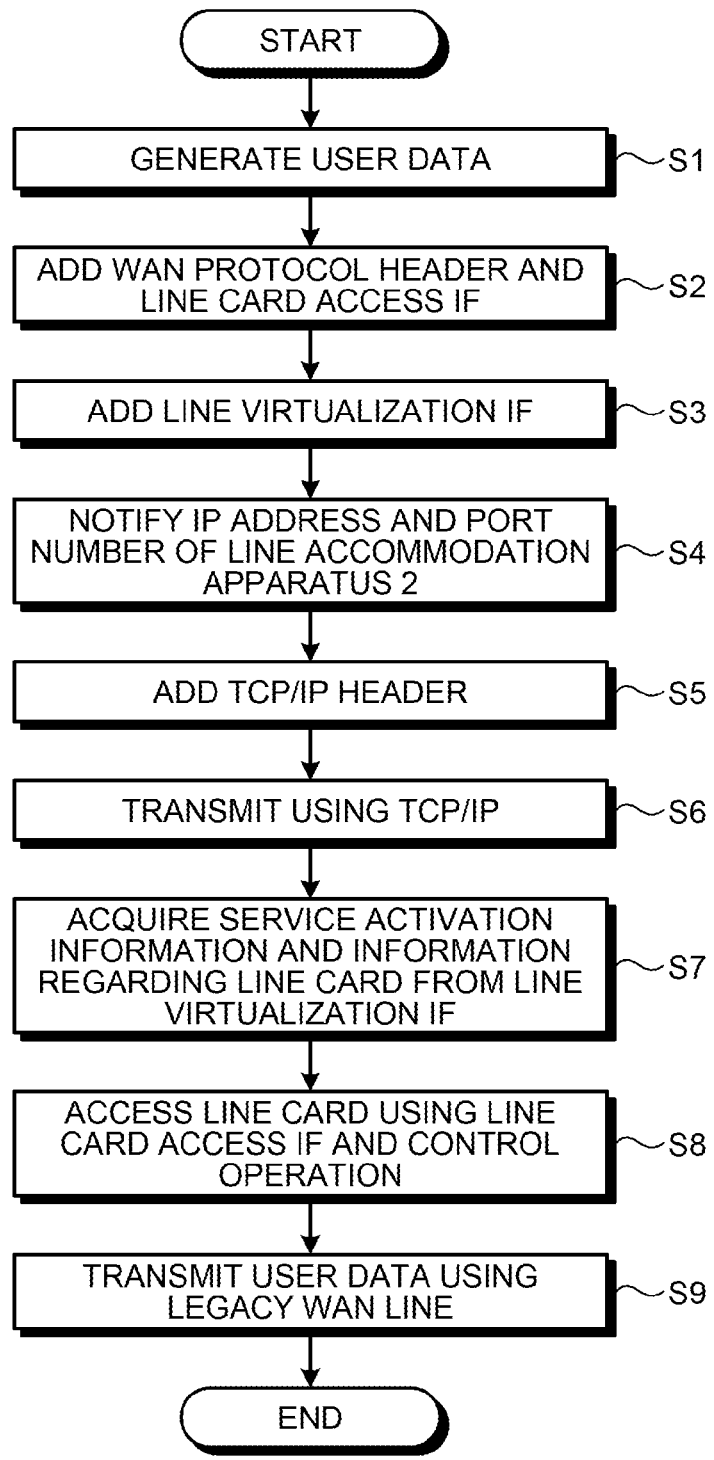
FIG. 10 is a flowchart illustrating the transmission of the user data performed by the communication control system according to the first embodiment.

Next, transmission of the user data by the communication control system according to this embodiment will be described with reference to FIG. 10. FIG. 10 is a flowchart illustrating the transmission of the user data by the communication control system according to the first embodiment.

The application execution unit 121 executes the application to perform communication using the legacy WAN line and generates the user data to be transmitted to the computer 3 via a legacy WAN line (step S1).

The WAN driver 122 receives the user data to be transmitted to the computer 3 via the legacy WAN line from the application execution unit 121. Then, the WAN driver 122 adds the WAN protocol header, which is control information used for the communication between the network common control unit 128 of the computer 1 and the computer 3, to the user data. Further, the WAN driver 122 adds the line card access IF, which is information regarding an interface accessing the line card 23, to the user data to which the WAN protocol header is added (step S2).

The WANonTCP/IP driver 123 receives, from the WAN driver 122, the user data to which the WAN protocol header and the line card access IF are added. The WANonTCP/IP driver 123 adds the line virtualization IF, which is information regarding the protocol defined between the WANonTCP/IP driver 123 and the line GW control unit 21, to the user data (step S3). Then, the WANonTCP/IP driver 123 notifies the TCP/IP driver 124 of the IP address and the port number of the line accommodation apparatus 2 using the socket communication (step S4).

The TCP/IP driver 124 receives the user data to which the line virtualization IF is added from the WANonTCP/IP driver 123. The TCP/IP driver 124 adds the TCP/IP header to the user data based on the IP address and the port number of the line accommodation apparatus 2 received by the socket communication (step S5).

The LAN driver 112 receives the user data to which the TCP/IP header is added by the TCP/IP driver 124 through the LAN multi-protocol control unit 125, the PV driver 126, the inner communication control driver 127, and the PV driver 111. The LAN driver 112 transmits the user data to the line accommodation apparatus 2 via the communication network 4 using the TCP/IP based on the information included in the TCP/IP header (step S6).

The line GW control unit 21 receives the user data transmitted via the communication network 4 using the TCP/IP. The line GW control unit 21 acquires the service activation information or the information regarding the line card from the line virtualization IF added to the user data (step S7). The line GW control unit 21 confirms that the service is activated using the legacy WAN line, and then transmits the user data together with the information regarding the line card to the line card driver 22.

The line card driver 22 receives the user data from the line GW control unit 21. The line card driver 22 accesses the line card 23 based on the information regarding the line card access IF added to the user data and controls an operation (step S8).

The line card driver 22 controls the line card 23 and transmits the user data to the computer 3 based on the information included in the WAN protocol header via the communication network 5 which is a legacy WAN line (step S9).

Figure 11:
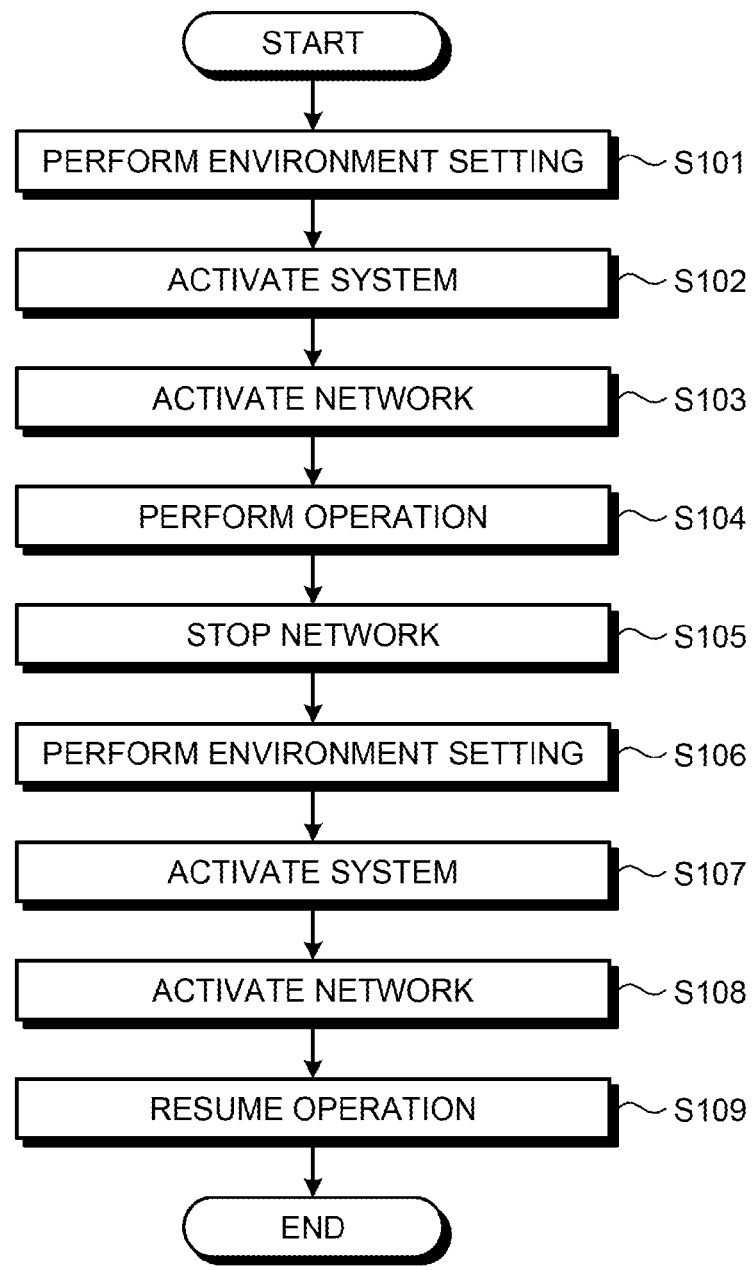
FIG. 11 is a flowchart illustrating preparation before an operation to the operation in a guest domain.

Next, a flow from preparation before an operation to the operation in the guest domain 12 will be described with reference to FIG. 11. FIG. 11 is a flowchart illustrating the preparation before the operation to the operation in the guest domain.

The operator performs environment setting of the guest domain 12 (step S101). For example, the environment setting includes definition of a virtual device and definition of network description. The definition of the virtual device includes, for example, definition of the information regarding the line card 23 to be used for the communication, the information regarding the slot inserted into the line card 23 to be used for the communication, and the IP address and the port number of the line accommodation apparatus 2. The network description includes the name of the line card 23 to be used for the communication and the information regarding the line address or the like corresponding to the line card 23. The environment setting includes setting of communication parameters of an LAN or a WAN corresponding to the communication network 4 or 5 for using a network. Specifically, the communication parameters include the information regarding the computer 1, the information regarding the computer 3, and a timer value used at the time of communication.

Next, the operator activates the system of the guest domain 12 (step S102). Thereafter, the guest domain 12 activates the virtual network with the management domain 11 and the network connecting the computer 1 to the line accommodation apparatus 2 (step S103). At this time, the guest domain 12 designates and activates the setting of the communication parameters of the LAN or the WAN included in the environment setting.

Then, the guest domain 12 performs the operation of the system (step S104). The operation of the system is, for example, execution of an application including transmission and reception of data to and from the computer 3 via the line accommodation apparatus 2.

When the operation needs to be changed, the guest domain 12 stops the virtual network with the management domain 11 and the network connecting the computer 1 to the line accommodation apparatus 2 (step S105).

Next, the operator performs the environment setting again by changing the definition of the virtual device or the network description in accordance with the contents of the change in the operation (step S106).

Next, the operator activates the system of the guest domain 12 (step S107). Thereafter, the guest domain 12 activates the virtual network with the management domain 11 and the network connecting the computer 1 to the line accommodation apparatus 2 (step S108). Thereafter, the guest domain 12 resumes the operation of the system (step S109).

Figure 12:
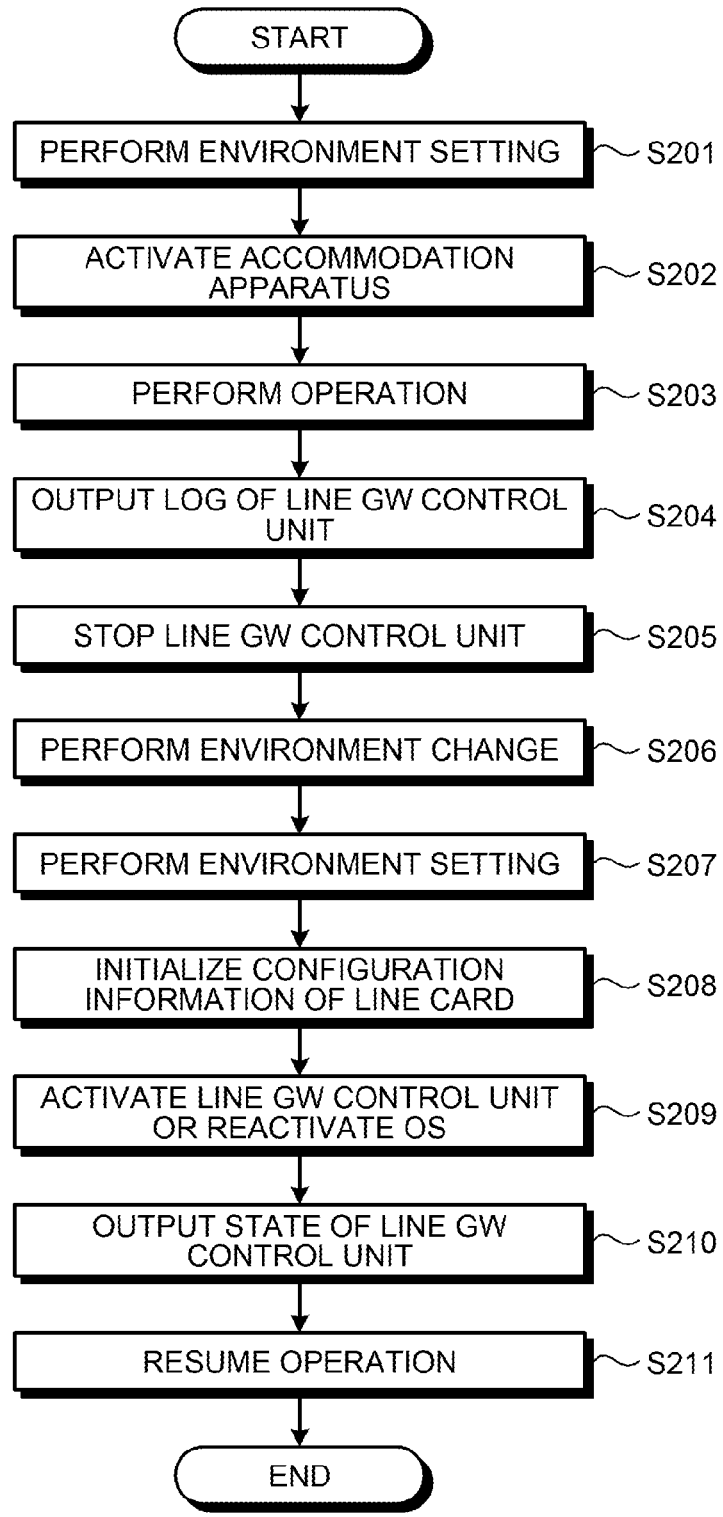
FIG. 12 is a flowchart illustrating preparation before an operation to the operation in the line accommodation apparatus.

Next, a flow from preparation before an operation to the operation in the line accommodation apparatus 2 will be described with reference to FIG. 12. FIG. 12 is a flowchart illustrating the preparation before the operation to the operation in the line accommodation apparatus.

The operator creates an environment definition file of the line accommodation apparatus 2 and performs environment setting (step S201). The environment setting includes, for example, setting of the entire line accommodation apparatus 2, such as the port number or the size of a log used for the communication in the line accommodation apparatus 2. The environment setting includes setting common to individual line cards such as the slot number on which each line card 23 is mounted and also includes information regarding the virtual system, such as the line address corresponding to each line card. When there is no information regarding the virtual system in the line accommodation apparatus 2, the information common to the individual line cards is validated. Further, there is no information common to the line individual cards, the setting of the entire line accommodation apparatus 2 is validated.

Next, the operator activates the line accommodation apparatus 2 (step S202).

Thereafter, the line accommodation apparatus 2 performs the operation of the system (step S203). Here, the operation of the system includes, for example, relay of transmission and reception of data between the computers 1 and 3. At this time, when the line accommodation apparatus 2 receives an instruction to output the state of the line GW control unit 21 from the operator, the line accommodation apparatus 2 creates and outputs the log of the line GW control unit 21 (step S204).

Then, when the operation may necessarily be changed, the line accommodation apparatus 2 stops the operation of the line GW control unit 21 (step S205).

Next, the operator performs environment change such as change in the line card 23 (step S206). At this time, the line accommodation apparatus 2 reactivates the OS in some cases.

Next, the operator performs the environment setting again by correcting the environment definition file (step S207).

Next, when the configuration of the line card 23 is changed, the line accommodation apparatus 2 initializes the configuration information of the line card (step S208).

Next, the line accommodation apparatus 2 activates the line GW control unit 21 or reactivates the OS (step S209). At this time, when the line accommodation apparatus 2 receives an instruction to output the state of the line GW control unit 21 from the operator, the line accommodation apparatus 2 creates and outputs the log of the line GW control unit 21 (step S210). Thereafter, the line accommodation apparatus 2 resumes the operation of the system (step S211).

Figure 13:
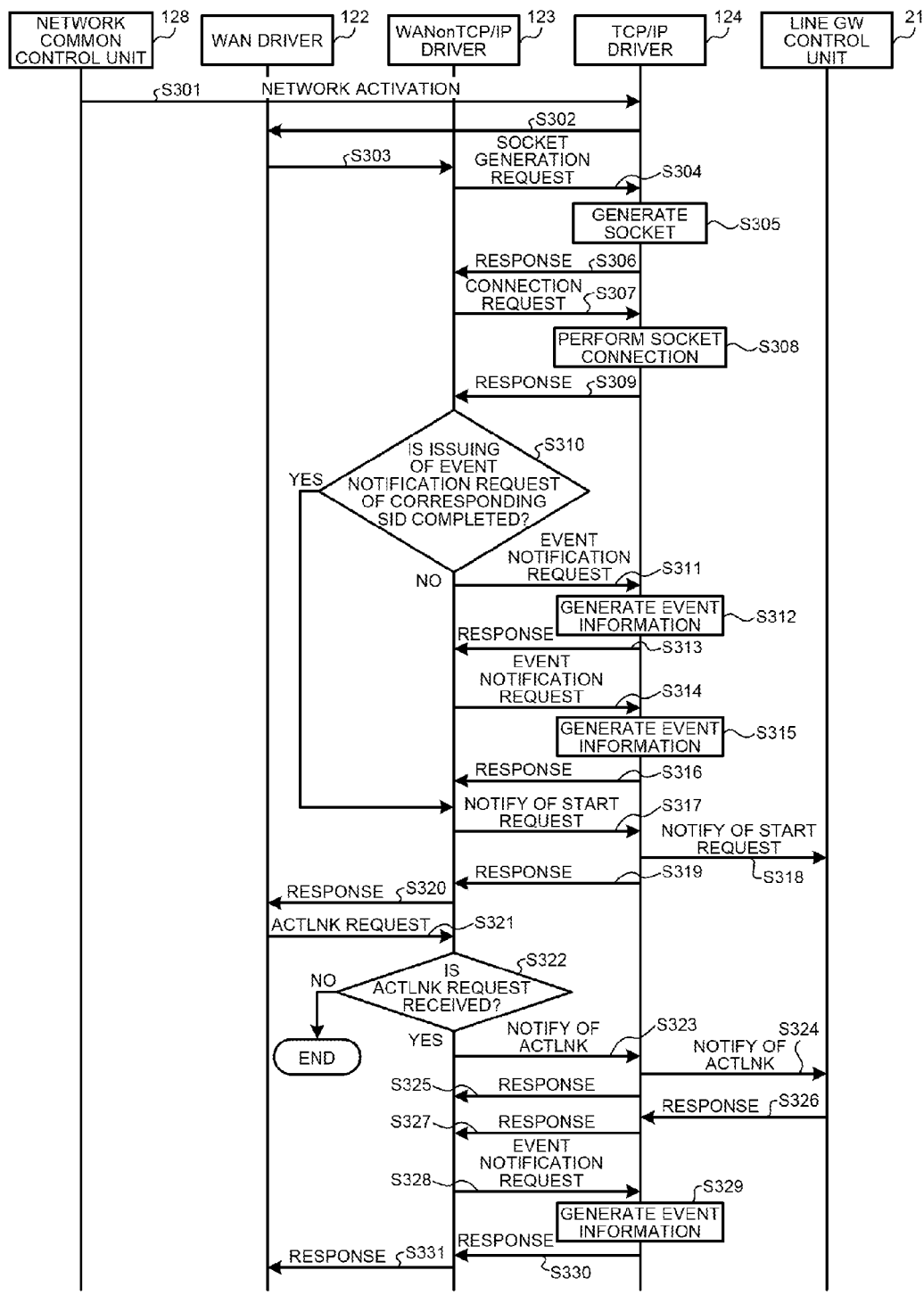
FIG. 13 is a diagram illustrating the sequence of connection between the guest domain and the line accommodation apparatus.

Next, connection between the guest domain 12 and the line accommodation apparatus 2 will be described with reference to FIG. 13. FIG. 13 is a diagram illustrating the sequence of the connection between the guest domain and the line accommodation apparatus.

The network common control unit 128 transmits a network activation request to the TCP/IP driver 124 (step S301).

The TCP/IP driver 124 notifies the WAN driver 122 that the network activation is executed (step S302).

The WAN driver 122 notifies the WANonTCP/IP driver 123 that the network activation is executed (step S303).

The WANonTCP/IP driver 123 transmits a socket generation request to the TCP/IP driver 124 (step S304).

The TCP/IP driver 124 generates a socket (step S305). Then, the TCP/IP driver 124 transmits a response to the socket generation completion to the WANonTCP/IP driver 123 (step S306).

The WANonTCP/IP driver 123 transmits a connection request to the TCP/IP driver 124 (step S307).

The TCP/IP driver 124 establishes the connection of the socket communication with the WANonTCP/IP driver 123 (step S308). Then, the TCP/IP driver 124 responds the establishment completion of the socket communication to the WANonTCP/IP driver 123 (step S309).

The WANonTCP/IP driver 123 determines whether issuing of an event notification request for the corresponding socket identifier (SID) is completed (step S310). The SID is a socket identifier of the socket communication. When the issuing of the event notification request is completed (Yes in step S310), the WANonTCP/IP driver 123 causes the process to proceed to step S317.

Conversely, when the issuing of the event notification request is not completed (No in step S310), the WANonTCP/IP driver 123 transmits the event notification request for notification of an error to the TCP/IP driver 124 (step S311). The TCP/IP driver 124 receives the event notification request for an error. When an error occurs, the TCP/IP driver 124 generates information regarding an error event (step S312). Then, the TCP/IP driver 124 notifies the WANonTCP/IP driver 123 of the information regarding the error event as a response to the WANonTCP/IP driver 123 (step S313).

Next, the WANonTCP/IP driver 123 transmits an event notification request for notification of normally received data to the TCP/IP driver 124 (step S314). The TCP/IP driver 124 receives the event notification request for the notification of normally received data. Then, when the TCP/IP driver 124 normally receives the data, the TCP/IP driver 124 generates information regarding the normal event (step S315). Then, the TCP/IP driver 124 notifies the WANonTCP/IP driver 123 of the information regarding the normal event as a response to the WANonTCP/IP driver 123 (step S316).

Next, the WANonTCP/IP driver 123 transmits a start request to the TCP/IP driver 124 (step S317). Accordingly, the TCP/IP driver 124 transmits a line request notification to the line GW control unit 21 (step S318). The TCP/IP driver 124 responds the completion of the transmission of the line request notification to the line GW control unit 21 to the WANonTCP/IP driver 123 (step S319). Accordingly, the WANonTCP/IP driver 123 responds the completion of the transmission of the line request notification to the line GW control unit 21 to the WAN driver 122 (step S320).

Net, the WAN driver 122 transmits an ACTLINK request which is an activation request to establish the connection with the line accommodation apparatus 2 to the WANonTCP/IP driver 123 (step S321).

The WANonTCP/IP driver 123 determines whether to receive the ACTLINK request (step S322). Here, in this embodiment, the activation of the line is referred to as "ACTLINK." When the WANonTCP/IP driver 123 does not receive the ACTLINK request (No in step S322), the WANonTCP/IP driver 123 ends the connection process.

Conversely, when the WANonTCP/IP driver 123 receives the ACTLINK request (Yes in step S322), the WANonTCP/IP driver 123 transmits, to the TCP/IP driver 124, an ACTLINK notification which is a notification of the instruction to establish the connection with the line accommodation apparatus 2 (step S323). Accordingly, the TCP/IP driver 124 transmits the ACTLINK notification to the line GW control unit 21 (step S324). Thereafter, the TCP/IP driver 124 responds the completion of the transmission of the ACTLINK notification to the line GW control unit 21 to the WANonTCP/IP driver 123 (step S325).

The line GW control unit 21 receives the ACTLINK notification and responds the fact that the line between the computers 1 and 3 is established to the TCP/IP driver 124 (step S326). Thereafter, the TCP/IP driver 124 is notified of an event. Then, the TCP/IP driver 124 responds the fact that the line between the computers 1 and 3 is established to the WANonTCP/IP driver 123 (step S327). The WANonTCP/IP driver 123 stands by from step S325 to step S327.

The WANonTCP/IP driver 123 receives the response from the TCP/IP driver 124, the WANonTCP/IP driver 123 transmits an event notification request for notification of normally received data to the TCP/IP driver 124 (step S328). Accordingly, when the TCP/IP driver 124 normally receives the data, the TCP/IP driver 124 generates information regarding the normal event (step S329). Then, the TCP/IP driver 124 responds the completion of the generation of the information regarding the normal event to the WANonTCP/IP driver 123 (step S330).

The WANonTCP/IP driver 123 notifies the WAN driver 122 of the information regarding the normal event as a response to the WAN driver 122 (step S331).

Figure 14:
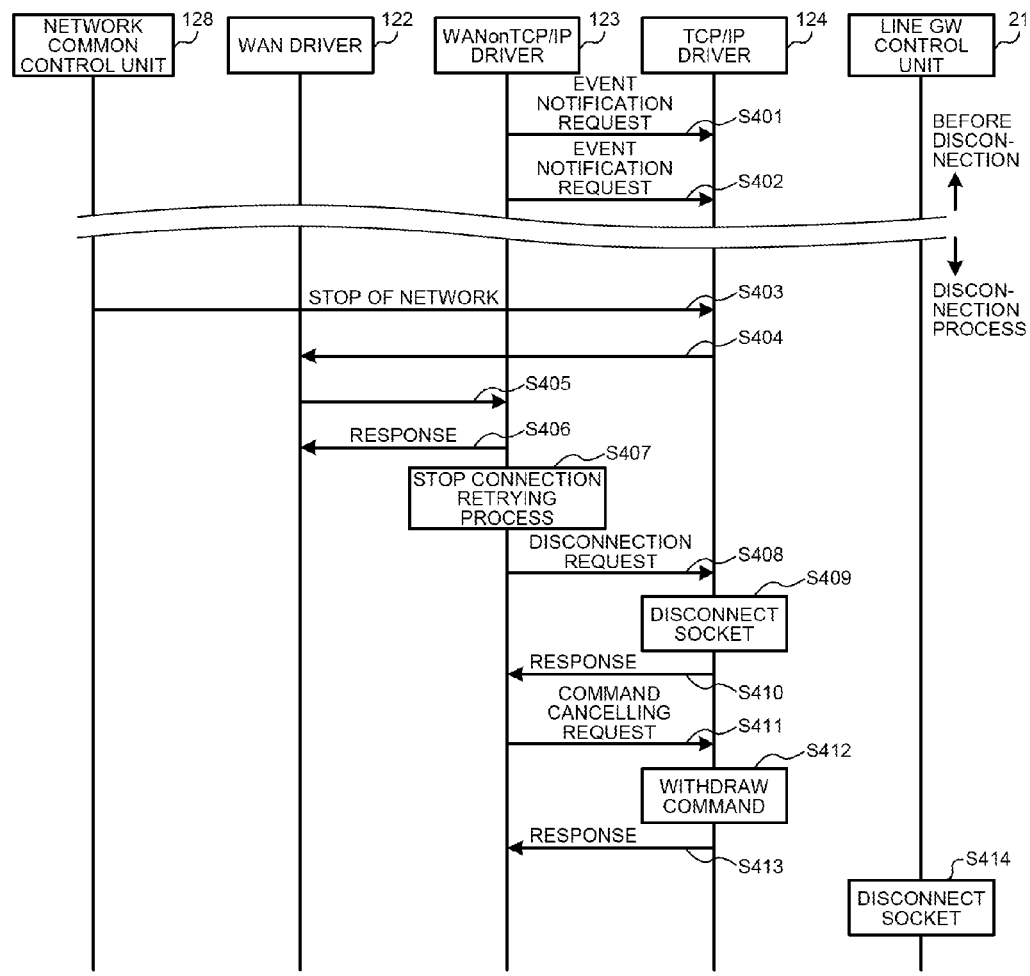
FIG. 14 is a diagram illustrating the sequence of disconnection between the guest domain and the line accommodation apparatus.

Next, disconnection of the guest domain 12 form the line accommodation apparatus 2 will be described with reference to FIG. 14. FIG. 14 is a diagram illustrating the sequence of the disconnection of the guest domain from the line accommodation apparatus.

Before the disconnection, the WANonTCP/IP driver 123 transmits an event notification request for notification of an error to the TCP/IP driver 124 (step S401) and transmits an event notification request of notification of normally received data to the TCP/IP driver 124 (step S402). After the establishment of the socket communication, the WANonTCP/IP driver 123 normally issues the event notification requests for the notification of the error and the normally received data in a unit of the SID.

When the disconnection process starts, the network common control unit 128 notifies the TCP/IP driver 124 of stop of the network (step S403).

The TCP/IP driver 124 transmits the notification of the stop of the network to the WAN driver 122 (step S404).

The WAN driver 122 transmits the notification of the stop of the network to the WANonTCP/IP driver 123 (step S405). Accordingly, the WANonTCP/IP driver 123 responds disconnection start to the WAN driver 122 (step S406).

The WANonTCP/IP driver 123 stops a connection retrying process (step S407).

Then, the WANonTCP/IP driver 123 transmits a disconnection request to the TCP/IP driver 124 (step S408).

The TCP/IP driver 124 disconnects the socket communication from the WANonTCP/IP driver 123 (step S409). Then, the TCP/IP driver 124 responds the disconnection of the socket communication to the WANonTCP/IP driver 123 (step S410).

The WANonTCP/IP driver 123 transmits a command cancelling request to the TCP/IP driver 124 (step S411). The command includes, for example, a reading or writing command. Accordingly, the TCP/IP driver 124 withdraws the command to the line GW control unit 21 (step S412). Then, the TCP/IP driver 124 responds the notification of the withdrawal of the command to the WANonTCP/IP driver 123 (step S413).

The line GW control unit 21 confirms the connection using a keep-alive function. When the connection is made but no command is transmitted, the socket communication between the computers 1 and 3 is disconnected (step S414).

In the communication control system according to this embodiment, as described above, the user data is transmitted to the line accommodation apparatus using the TCP/IP, when a communication is requested using a protocol other than the TCP/IP in an application. The line accommodation apparatus transmits the user data to a partner computer using a mounted line card in conformity with the protocol other than the TCP/IP. Thus, the line card is not necessarily mounted on a computer executing the application. Therefore, the computer that executes the application performing the legacy WAN communication can easily be embedded in a virtualization system. Thus, the system performing the legacy WAN communication can easily be associated with the virtualization system.

Since the line card which is a network card unique to the communication and using the legacy WAN line is not mounted on a computer in the virtualization system, the migration function of the virtualization machine can be used.

Further, the line cards are collectively mounted on the line accommodation apparatus. Therefore, when one line card has a plurality of lines, a plurality of computers can simultaneously perform communication using one line card. On the other hand, when a line card is mounted on a computer, a line of the line card may be useless due to the fact that the line card is not able to be used by another computer.

[b] Second Embodiment

Figure 15:
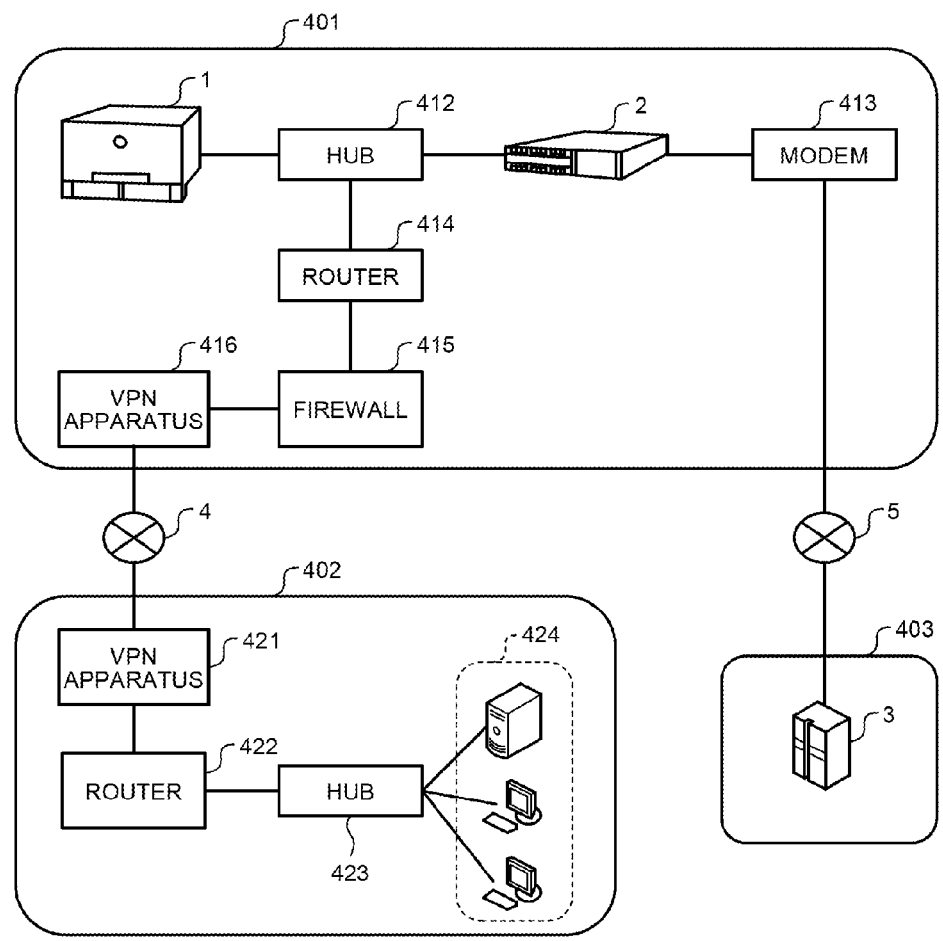
FIG. 15 is a diagram illustrating the configuration of a communication control system according to a second embodiment.

FIG. 15 is a diagram illustrating the configuration of a communication control system according to a second embodiment. In this embodiment, an example of actual construction of the communication control system will be described.

A data center 401 is a center in which various computer resources or apparatuses of data communication or the like are provided to systems 402 and 403. The data center 401 includes a system that provides various applications using a virtualization system and provides a cloud service. The systems 402 and 403 are systems which are provided with the cloud service. The data center 401 and the system 402 are connected to each other by the communication network 4 that performs communication using the TCP/IP. The communication network 4 is, for example, an IP-virtual private network (VPN). The data center 401 and the system 403 are connected to each other by a communication network 5 which is a legacy WAN line performing communication using a protocol other than the TCP/IP.

The data center 401 includes the computer 1 and the line accommodation apparatus 2 according to the first embodiment, a HUB 412, a modem 413, a router 414, a firewall 415, and a VPN apparatus 416.

The user data transmitted from the computer 1 to the computer 3 is transmitted to the line accommodation apparatus 2 via the HUB 412. Specifically, the computer 1 adds the WAN protocol header 302, the line card access IF 303, the line virtualization IF 304, and the TCP/IP header 305 illustrated in FIG. 9 to the user data and outputs the user data to the line accommodation apparatus 2 via the HUB 412. When the line accommodation apparatus 2 receives the user data transmitted by the computer 1, the line accommodation apparatus 2 transmits the user data to the computer 3 based on the WAN protocol header 302, the line card access IF 303, and the line virtualization IF 304 which are added to the data via the communication network 5.

The data transmitted from the computer 3 is input to the modem 413 via the communication network 5. After the TCP/IP header is added to the data transmitted from the computer 3 in the line accommodation apparatus 2, the user data is transmitted to the computer 1 via the HUB 412 using the TCP/IP. Then, the computer 1 delivers the user data to an application based on the WAN protocol header 302, the line card access IF 303, and the line virtualization IF 304 illustrated in FIG. 9.

The VPN apparatus 416 is connected to the communication network 4. The user data transmitted from the computer 1 to a computer 424 is input to the VPN apparatus 416 via the communication network 4 using the TCP/IP through the HUB 412, the router 414, the firewall 415, and the VPN apparatus 416. The plurality of computers 424 are illustrated in the drawing, but any computer among the plurality of computers will be exemplified as the computer 424. Data transmitted from the computer 424 is input to the VPN apparatus 416 via the communication network 4 using the TCP/IP. Thereafter, the data transmitted from the computer 424 is transmitted to the computer 1 via the firewall 415, the router 414, and the HUB 412.

The system 402 includes the computers 424. The computers 424 are connected to a HUB 423. The HUB 423 is connected to a router 422. The router 422 is connected to a VPN apparatus 421. The computers 424 transmit and receive data to and from the data center 401 via the HUB 423, the router 422, the VPN apparatus 421, and the communication network 4.

The system 403 includes the computer 3 according to the first embodiment. Here, only one computer is illustrated in the drawing, but the number of computers is not limited in the system 403. The computer 3 receives the user data transmitted by the computer 1 via the line accommodation apparatus 2, the modem 413, and the communication network 5. The computer 3 transmits data for the computer 1 to the line accommodation apparatus 2 via the communication network 5 and the modem 413. Thus, in the system 403, the data can be transmitted and received to and from the computer 1 using the protocol other than the TCP/IP, and thus the cloud service can be received.

As described above, in this embodiment, the computer providing the cloud service, the line accommodation apparatus, and the computer provided with the cloud service can be located at the same place. That is, the line accommodation apparatus can be disposed within the data center providing the cloud service.

[c] Third Embodiment

Figure 16:
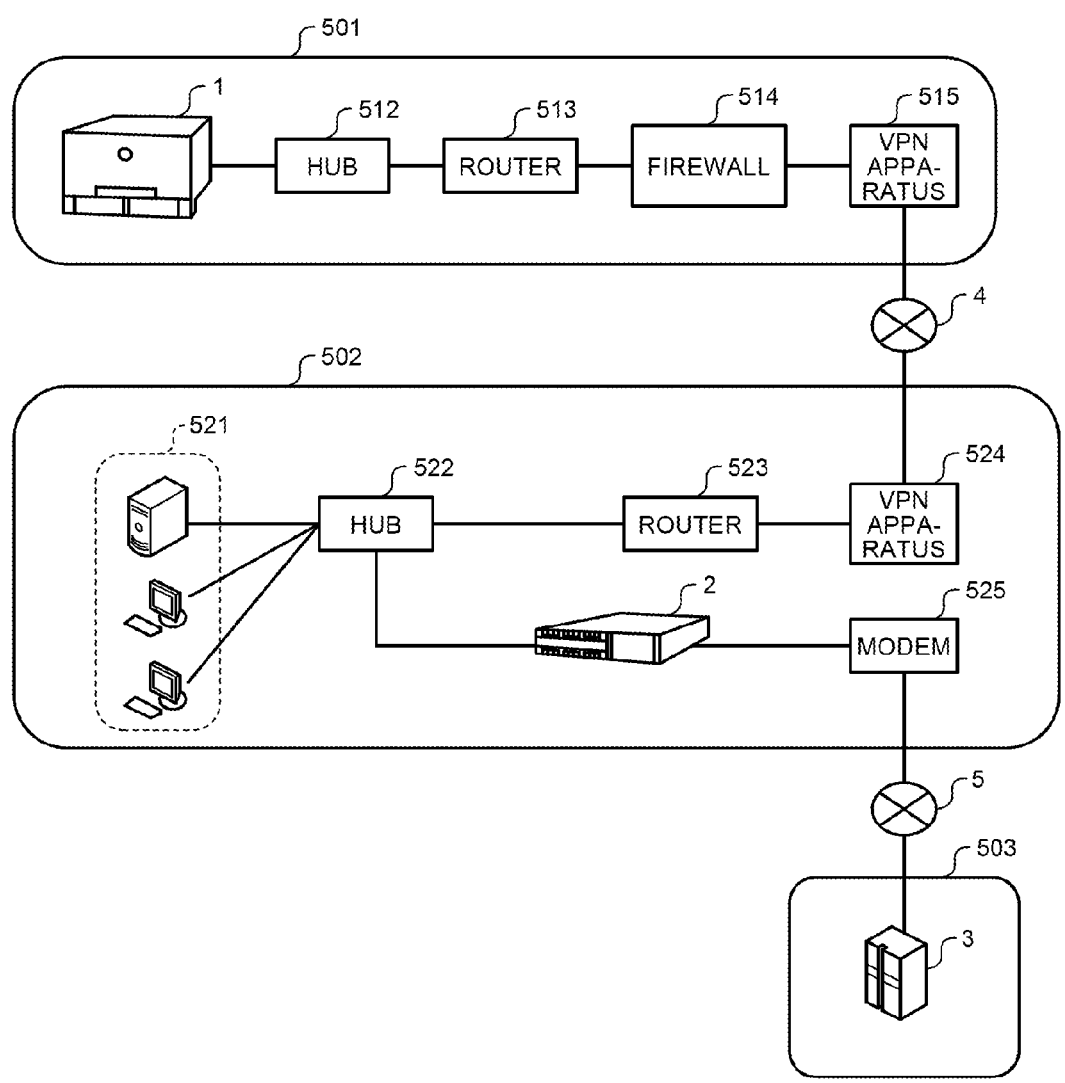
FIG. 16 is a diagram illustrating the configuration of a communication control system according to a third embodiment.

FIG. 16 is a diagram illustrating the configuration of a communication control system according to a third embodiment. In this embodiment, another construction example of the communication control system will be described.

A data center 501 is a center in which various computer resources or apparatuses of data communication or the like are provided to systems 502 and 503. The data center 501 includes a system that provides various applications using a virtualization system and provides a cloud service. The system 502 is a system of a company that entrusts provision of a cloud service to the data center. The system 502 can be provided with the cloud service. The system 503 is a system that is provided with the cloud service. The data center 501 and the system 502 are connected to each other by a communication network 4 performing communication using the TCP/IP. The communication network 4 is, for example, an Internet protocol-virtual private network (IP-VPN). The systems 502 and 503 are connected to each other by a communication network 5 which is a legacy WAN line performing communication using a protocol other than the TCP/IP.

The data center 501 includes the computer 1 according to the first embodiment, a HUB 512, a router 513, a firewall 514, and a VPN apparatus 515.

The computer 1 adds the WAN protocol header 302, the line card access IF 303, the line virtualization IF 304, and the TCP/IP header 305 illustrated in FIG. 8 to the user data. The computer 1 transmits the user data to a VPN apparatus 524 of the system 502 via the HUB 512, the router 513, the firewall 514, and the VPN apparatus 515 and via the communication network 4 using the TCP/IP. Data transmitted from the system 502 is transmitted via the communication network 4 using the TCP/IP, and then is transmitted to the computer 1 via the VPN apparatus 515, the firewall 514, the router 513, and the HUB 512.

The system 502 includes the line accommodation apparatus 2 according to the first embodiment, computers 521, a HUB 522, a router 523, the VPN apparatus 524, and a modem 525. The computers 521 are connected to the HUB 522. The HUB 522 is connected to the router 523 and the line accommodation apparatus 2. The router 523 is connected to the VPN apparatus 524. The line accommodation apparatus 2 is connected to the modem 525.

The line accommodation apparatus 2 receives the user data transmitted to the computer 3 by the computer 1 using the TCP/IP. The line accommodation apparatus 2 controls the line card based on the WAN protocol header 302, the line card access IF 303, and the line virtualization IF 304 which are added to the received user data and transmits the user data to the computer 3 via the communication network 5. The line accommodation apparatus 2 receives the data transmitted from the computer 3 via the line card using the protocol other than the TCP/IP. Then, the line accommodation apparatus 2 transmits the user data to the computer 1 via the communication network 4 using the TCP/IP.

The computer 521 transmits and receives data to and from the data center 501 via the HUB 522, the router 523, the VPN apparatus 524, and the communication network 4 using the TCP/IP.

The system 503 includes the computer 3 according to the first embodiment. The computer 3 receives the user data transmitted by the computer 1 from the line accommodation apparatus 2 using the protocol other than the TCP/IP. Then, the computer 3 transmits data for the computer 1 to the line accommodation apparatus 2 via the communication network 5 and the modem 525. Thus, in the system 503, the data can be transmitted and received to and from the computer 1 using the protocol other than the TCP/IP, and thus the cloud service can be received.

In this embodiment, as described above, the computer providing the cloud service and the line accommodation apparatus can be located at different places. That is, different companies can own the computer and the line accommodation apparatus providing the cloud service and the computer provided with the cloud service, respectively. Thus, the company entrusting the provision of the cloud service to the data center can own the line accommodation apparatus.

In the communication control system, the communication control method, and the communication control program according to an aspect of the present disclosure, it is possible to obtain the advantage of easily associating a system that performs communication using a legacy WAN line with a virtualization system.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control system comprising:
an information processing apparatus in which a plurality of virtual machines having different identification information are performed and a line accommodation apparatus to connect between each virtual machine on the information processing apparatus and another information processing apparatus by using a network card, wherein the information processing apparatus includes:
   a first protocol data processing unit that processes data to be transmitted from one of the plurality of virtual machines to another information processing apparatus so as to use a first protocol;
   a second protocol data processing unit that adds control information of the network card and identification information of a corresponding virtual machine to the data processed by the first protocol data processing unit and processes the data so as to use a second protocol different from the first protocol, the control information being used to transmit data using a third protocol different from both the first and second protocols, and
   a data transmitting unit that transmits the data processed by the second protocol data processing unit to the line accommodation apparatus using the second protocol, and
wherein the line accommodation apparatus includes:
   a plurality of network cards, each network card having a plurality of line addresses, each of the line address corresponding to identification information of the virtual machine;
   a data converting unit that acquires the added identification information of the network of a receiving side and the network of a transmitting side of the line accommodation apparatus from the data received from the data transmitting unit, extracts the network card having the line addresses corresponding to the identification information from the plurality of network cards, and converts the received data so as to use the third protocol; and
   a transmitting unit that controls the network card extracted by the data converting unit using the control information of the network card included in the data transmitted from the data transmitting unit and transmits the data converted by the data converting unit to the another information processing apparatus via the network card extracted by the data converting unit using the third protocol;
   receiving, by the data converting unit, the data transmitted from the data transmitting unit and restoring the received data to a state processed by the first protocol data processing unit.

2. The communication control system according to claim 1, wherein the second protocol is the TCP/IP and the first protocol is a protocol other than a WANonTCP/IP.

3. A communication control method of a communication control system including an information processing apparatus in which a plurality of virtual machines having different identification information are performed, and a line accommodation apparatus to connect between each virtual machine on the information processing apparatus and another information processing apparatus by using a network card, the method comprising:

processing, by the information processing apparatus, data to be transmitted from the plurality of virtual machines to another information processing apparatus so as to use a first protocol;
adding, by the information processing apparatus, control information of the network card and identification information of a corresponding virtual machine to the data processed so as to use the first protocol and processing the data so as to use a second protocol different from the first protocol, the control information being used to transmit data using a third protocol different from both the first and second protocols, and
transmitting, by the information processing apparatus, the data processed so as to use the second protocol to the line accommodation apparatus using the second protocol, and
acquiring, by the line accommodation apparatus, the added control information of the network card and the identification information of the corresponding virtual machine from the data received from the information processing apparatus,
extracting, by the line accommodation apparatus, the network card having a plurality of line addresses corresponding to the identification information from a plurality of network cards having the plurality of line addresses, each of the line addresses corresponding to identification information of the virtual machine;
converting, by the line accommodation apparatus, the received data so as to use the third protocol;
controlling, by the line accommodation apparatus, the extracted network card using the control information of the network card included in the transmitted data; and
transmitting, by the line accommodation apparatus, the data processed so as to use the third protocol to the another information processing apparatus via the extracted network card using the third protocol;
receiving, by the line accommodation apparatus, the data transmitted and restoring the received data to a first state of the first protocol.

4. A non-transitory computer-readable recording medium having stored therein a program for causing a communication control system including an information processing apparatus in which a plurality of virtual machines having different identification information are performed, and a line accommodation apparatus which connect between each virtual machine on the information processing apparatus and another information processing apparatus by using a network card to execute a process comprising:
processing, by the information processing apparatus, data to be transmitted from the plurality of virtual machines to another information processing apparatus so as to use a first protocol;
adding, by the information processing apparatus, control information of the network card and identification information of a corresponding virtual machine to the data processed so as to use the first protocol and processing the data so as to use a second protocol different from the first protocol, the control information being used to transmit data using a third protocol different from both the first and second protocols;
transmitting, by the information processing apparatus, the data processed so as to use the second protocol to the line accommodation apparatus using the second protocol;
acquiring, by the line accommodation apparatus, the added control information of the network card and the identification information of the corresponding virtual machine from the data received from the information processing apparatus;

extracting, by the line accommodation apparatus, the network card having a plurality of line addresses corresponding to the control identification information from a plurality of network cards having the plurality of line addresses, each of the line addresses corresponding to identification information of the virtual machine, converting, by the line accommodation apparatus, the received data so as to use a third protocol;

controlling, by the line accommodation apparatus, the extracted network card using the control information of the network card included in the transmitted data, and transmitting, by the line accommodation apparatus, the data processed so as to use the third protocol to another information processing apparatus via the extracted network card using the third protocol;

receiving, by the line accommodation apparatus, the data transmitted and restoring the received data to a first state of the first protocol.

5. The communication control system according to claim 1, wherein the second protocol data processing unit also adds control information of the network card which is extracted by the data converting unit to the data processed by the first protocol data processing unit, the control information being used to transmit data using the third protocol, and wherein the transmitting unit controls the network card specified by the data converting unit using the control information of the network card included in the data transmitted from the data transmitting unit and transmits the data converted by the data converting unit to another information processing apparatus.

* * * * *